(12) United States Patent
Amikawa

(10) Patent No.: US 9,172,893 B2
(45) Date of Patent: Oct. 27, 2015

(54) SOLID-STATE IMAGING DEVICE AND IMAGING APPARATUS

(71) Applicant: PANASONIC CORPORATION, Osaka (JP)

(72) Inventor: Hiroyuki Amikawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 143 days.

(21) Appl. No.: 14/084,381

(22) Filed: Nov. 19, 2013

(65) Prior Publication Data

US 2014/0078363 A1 Mar. 20, 2014

Related U.S. Application Data

(63) Continuation of application No. PCT/JP2012/003164, filed on May 15, 2012.

(30) Foreign Application Priority Data

May 26, 2011 (JP) ................ 2011-118098

(51) Int. Cl.
*H04N 5/369* (2011.01)
*H04N 5/376* (2011.01)
*H04N 5/357* (2011.01)

(52) U.S. Cl.
CPC ............. *H04N 5/3698* (2013.01); *H04N 5/357* (2013.01); *H04N 5/376* (2013.01)

(58) Field of Classification Search
None
See application file for complete search history.

(56) References Cited

U.S. PATENT DOCUMENTS

2009/0303362 A1   12/2009   Ebihara

FOREIGN PATENT DOCUMENTS

| JP | 06-113208 A | 4/1994 |
| JP | 2006-319684 A | 11/2006 |
| JP | 2009-296400 A | 12/2009 |
| JP | 2010-263343 A | 11/2010 |

OTHER PUBLICATIONS

International Search Report issued in PCT/JP2012/003164, dated Jul. 10, 2012, with English translation.

*Primary Examiner* — James Hannett
*Assistant Examiner* — Yih-Sien Kao
(74) *Attorney, Agent, or Firm* — McDermott Will & Emery LLP

(57) ABSTRACT

A solid-state imaging device includes a pixel array, control lines TG each provided for a corresponding one of rows of pixels and configured to control, e.g., operation of a transfer transistor, and a driver circuit 103 configured to control the operation of the transfer transistor through the control lines TG and connected to a power-supply line TGL. The solid-state imaging device performs all reset operation for resetting signal charges of all pixels by the driver circuit 103 and reading operation for reading a pixel signal from each row of the pixels. An impedance controller 130 configured to control an impedance value for power-supply line TGL in the reading operation to be less than an impedance value for power-supply line TGL in the all reset operation is provided.

17 Claims, 16 Drawing Sheets

SOLID-STATE IMAGING DEVICE AND IMAGING APPARATUS

CROSS-REFERENCE TO RELATED APPLICATIONS

This is a continuation of International Application No. PCT/JP2012/003164 filed on May 15, 2012, which claims priority to Japanese Patent Application No. 2011-118098 filed on May 26, 2011. The entire disclosures of these applications are incorporated by reference herein.

BACKGROUND

The technique disclosed herein relates to a solid-state imaging device and an imaging apparatus.

In recent years, digital cameras etc. including built-in solid-state imaging devices have been widely used.

FIG. 16 is a diagram illustrating a configuration of a conventional solid-state imaging device. Referring to FIG. 16, a conventional solid-state imaging device 10 includes a pixel array 11, a row selector circuit (Vdec) 12, a column reader circuit (AFE) 13, a shutter mode adaptor 14, and a shutter mode switcher 15. Control lines (LRST, LTRG, LSEL) configured to drive pixel parts are connected between the row selector circuit 12 and the pixel array 11.

The pixel array 11 is formed of pixels arranged in rows and columns. In each of the pixels, a photodiode (PD) configured to perform photoelectric conversion, a floating diffusion (FD) configured to store a charge, a transfer transistor, a reset transistor, an amplifier transistor, etc. are provided.

The column reader circuit 13 receives, through signal output lines LSGN, data from each row of the pixels controlled to a readable state by the row selector circuit 12, and transfers such data to a signal processing circuit provided at a subsequent stage. The column reader circuit 13 includes, e.g., a correlated double sampling (CDS) circuit and an analog-to-digital converter (ADC).

A shutter mode switching signal SHRMODE output from the shutter mode switcher 15 is input to the row selector circuit 12. A resistor RVDD is provided between the row selector circuit 12 and a power supply VDD, and another resistor RVDD is provided between the row selector circuit 12 and ground VSS.

A rolling shutter method broadly employed for obtaining a moving picture and a global shutter method broadly employed for obtaining a still image have been known as exposure methods in solid-state imaging devices.

In the rolling shutter method, reset, exposure, and reading for pixels arranged in the same row are simultaneously performed. Exposure timing is different among the rows, resulting in occurrence of image distortion.

On the other hand, in the global shutter method, reset and exposure of all pixels are simultaneously performed. Thus, no image distortion occurs between adjacent ones of rows.

In the global shutter method, it is necessary to simultaneously perform exposure of all pixels. In, e.g., the case where the global shutter method is realized in combination with a liquid crystal shutter or a mechanical shutter, PDs of all pixels are reset with the shutter being opened. Such operation is called "all reset operation."

After the lapse of a predetermined exposure time, the shutter is closed such that the PDs of the pixels are not exposed to light. In this way, exposure of all pixels is simultaneously performed.

Since the PDs of all pixels are simultaneously reset in the global shutter method, all reset signals RST are simultaneously switched. Reading in the global shutter method is similar to that of the rolling shutter method.

However, if the global shutter method is employed, it is necessary to simultaneously switch the potentials of all reset signals RST and transfer signals TRG (control signals for transfer transistors) (i.e., to perform the all reset operation). For such a reason, an excessive instantaneous current flows in the case of the global shutter method, and therefore there is a disadvantage that countermeasures against noise of a power supply is required. Moreover, if power supply capability is not sufficient, a latch-up is caused by an instantaneous change in voltage due to the instantaneous current, and, as a result, there is a possibility that the solid-state imaging device is damaged.

In the prior art, an impedance element (e.g., the resistor RVDD illustrated in FIG. 16) is, as the countermeasures against noise of the power supply, inserted between a pixel driver circuit and a power supply terminal thereof to reduce an excessive instantaneous current in the all reset operation.

SUMMARY

However, in the conventional solid-state imaging device, since the impedance element is inserted between the pixel driver circuit and the power supply terminal thereof in the row selector circuit 12, a time constant between the control line configured to drive the pixels and the power supply increases upon reading. Thus, when the potential of the control line swings, there are concerns that a time for converging the potential swing is extended. If the swing of the potential of the control line is transmitted to the FDs of the selected row, the potential swing is output together with a signal component, resulting in noise. This causes degradation of an image quality.

The present disclosure aims to provide a solid-state imaging device which is capable of reducing an excessive instantaneous current in all reset operation without influences on reading operation.

In order to accomplish the foregoing, a solid-state imaging device of one example of the present disclosure includes a pixel array formed of a plurality of pixels arranged in rows and columns, each pixel including a photoelectric conversion element configured to convert incident light into a signal charge, a floating diffusion, a transfer transistor configured to transfer the signal charge generated by the photoelectric conversion element to the floating diffusion, an amplifier transistor configured to convert the signal charge transferred to the floating diffusion into an image signal which is a voltage signal and output the image signal, and a reset transistor configured to supply a reset potential to the floating diffusion; and a driver circuit configured to control operation of the transfer transistor and the reset transistor through a plurality of control lines each provided for a corresponding one of the rows of the pixels of the pixel array and connected to a power-supply line. The driver circuit performs all reset operation in which the signal charges are reset at all pixels and reading operation in which the image signal is read from each row of the pixels of the pixel array. An impedance controller configured to control an impedance value for the power-supply line in the reading operation to be less than an impedance value for the power-supply line in the all reset operation is provided.

According to the foregoing configuration, the impedance value for power-supply line is relatively large in the all reset operation. Thus, an excessive instantaneous current flow through the power-supply line can be reduced, and it is less likely that the solid-state imaging device is damaged. Moreover, the impedance value for power-supply line is relatively small in the reading operation. Thus, swing of the potential of the control line can be reduced, and occurrence of noise can be reduced. Further, a circuit area does not significantly increase.

An impedance switcher circuit connected to the power-supply line and having two or more switchable current paths may be provided as the impedance controller.

The power-supply line may include first and second power-supply lines. The driver circuit may be provided for each row of the pixels, and may include a plurality of buffer circuits connected to the first and second power-supply lines. A second impedance element may be provided in the second power-supply line. A first switch may be provided between the first power-supply line and each buffer circuit. A second switch may be provided between the second power-supply line and each buffer circuit. The impedance controller may include the first and second power-supply lines, the first and second switches, and the second impedance element.

An imaging apparatus of one example of the present disclosure includes a solid-state imaging device configured to output a pixel signal corresponding to incident light; an imaging optical system configured to guide the incident light to the solid-state imaging device; and a signal processor configured to process the pixel signal output from the solid-state imaging device. The solid-state imaging device includes a pixel array formed of a plurality of pixels arranged in rows and columns, each pixel including a photoelectric conversion element configured to convert the incident light into a signal charge, a floating diffusion, a transfer transistor configured to transfer the signal charge generated by the photoelectric conversion element to the floating diffusion, an amplifier transistor configured to convert the signal charge transferred to the floating diffusion into an image signal which is a voltage signal and output the image signal, and a reset transistor configured to supply a reset potential to the floating diffusion, and a driver circuit configured to control operation of the transfer transistor and the reset transistor through a plurality of control lines each provided for a corresponding one of the rows of the pixels of the pixel array and connected to a power-supply line. The driver circuit performs all reset operation in which the signal charges are reset at all pixels and reading operation in which the image signal is read from each row of the pixels of the pixel array. An impedance controller configured to control an impedance value for the power-supply line in the reading operation to be less than an impedance value for the power-supply line in the all reset operation is provided.

According to the foregoing configuration, it is less likely that the solid-state imaging device is damaged by an instantaneous current as described above, and noise contained in a pixel signal output from the solid-state imaging device is reduced. Thus, a good image can be obtained with high reliability.

In the solid-state imaging device and the imaging apparatus of one example of the present disclosure, an excessive instantaneous current can be reduced in the all reset operation without significantly increasing a circuit size and providing influences on the reading operation.

DETAILED DESCRIPTION (First Embodiment)

A solid-state imaging device of a first embodiment of the present disclosure and a method for driving the solid-state imaging device will be described below with reference to drawings.

Figure 1:
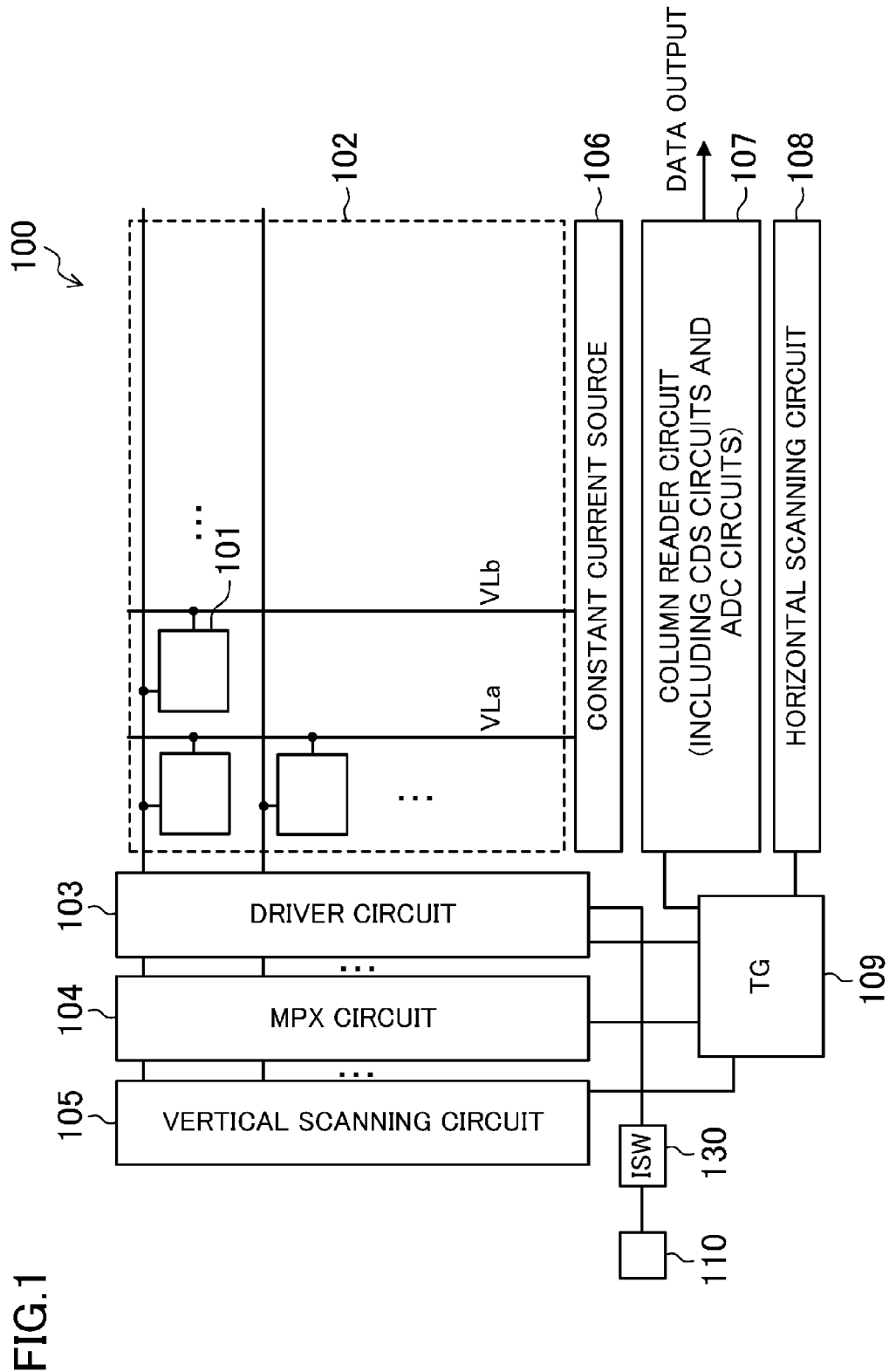
FIG. 1 is a diagram illustrating a configuration of a solid-state imaging device of a first embodiment.

FIG. 1 is a diagram illustrating a configuration of the solid-state imaging device of the first embodiment.

Referring to FIG. 1, a solid-state imaging device 100 of the present embodiment includes a pixel array 102 in which many pixel cells 101 each including photodiodes (photoelectric conversion elements) each configured to perform photoelectric conversion and transistors are arranged in rows and columns, a driver circuit 103 configured to drive the pixel array 102, a multiplexer (MPX) circuit 104, a vertical scanning circuit 105, vertical signal lines VLa, VLb, . . . (hereinafter referred to as "vertical signal lines VL") each configured to transmit a pixel signal read from the pixel cell 101 to a corresponding one of column circuits, a constant current source 106 connected to the vertical signal lines VL, a column reader circuit 107 configured to receive a pixel signal transmitted by the vertical signal line VL through the constant current source 106, a horizontal scanning circuit 108 configured to control transmission of a pixel signal in the horizontal direction in the column reader circuit 107, and a timing generator (TG) circuit 109 configured to supply control pulses to the vertical scanning circuit 105, the MPX circuit 104, the driver circuit 103, the column reader circuit 107, and the horizontal scanning circuit 108.

The column reader circuit 107 includes noise canceller (CDS) circuits each configured to receive a pixel signal for a single column and having a difference unit, and analog-to-digital converter (ADC) circuits configured to receive a pixel signal from the CDS circuit. Analog-to-digital converted data for a column selected by the horizontal scanning circuit 108 is successively output to outside the solid-state imaging device. A PAD 110 for power supply terminal is connected to the driver circuit 103.

Each CDS circuit of the column reader circuit 107 is connected to, e.g., a corresponding one of the columns of unit pixels (pixel cells 101) arranged in rows and columns in the pixel array 102. Moreover, the CDS circuit performs correlated double sampling (CDS) for a pixel signal output from the pixel cell 101 of the row selected by the vertical scanning circuit 105 through the vertical signal line VL. This reduces reset noise generated at the pixel cell 101 and fixed pattern noise which is unique to the pixel and which is generated due to variation in threshold value of the transistor. Moreover, a processed pixel signal is temporarily held at the CDS circuit.

The ADC circuit has an auto gain control (AGC) function and an analog-to-digital conversion function. The ADC circuit converts an analog pixel signal held at the CDS circuit into a digital signal.

Figure 2:
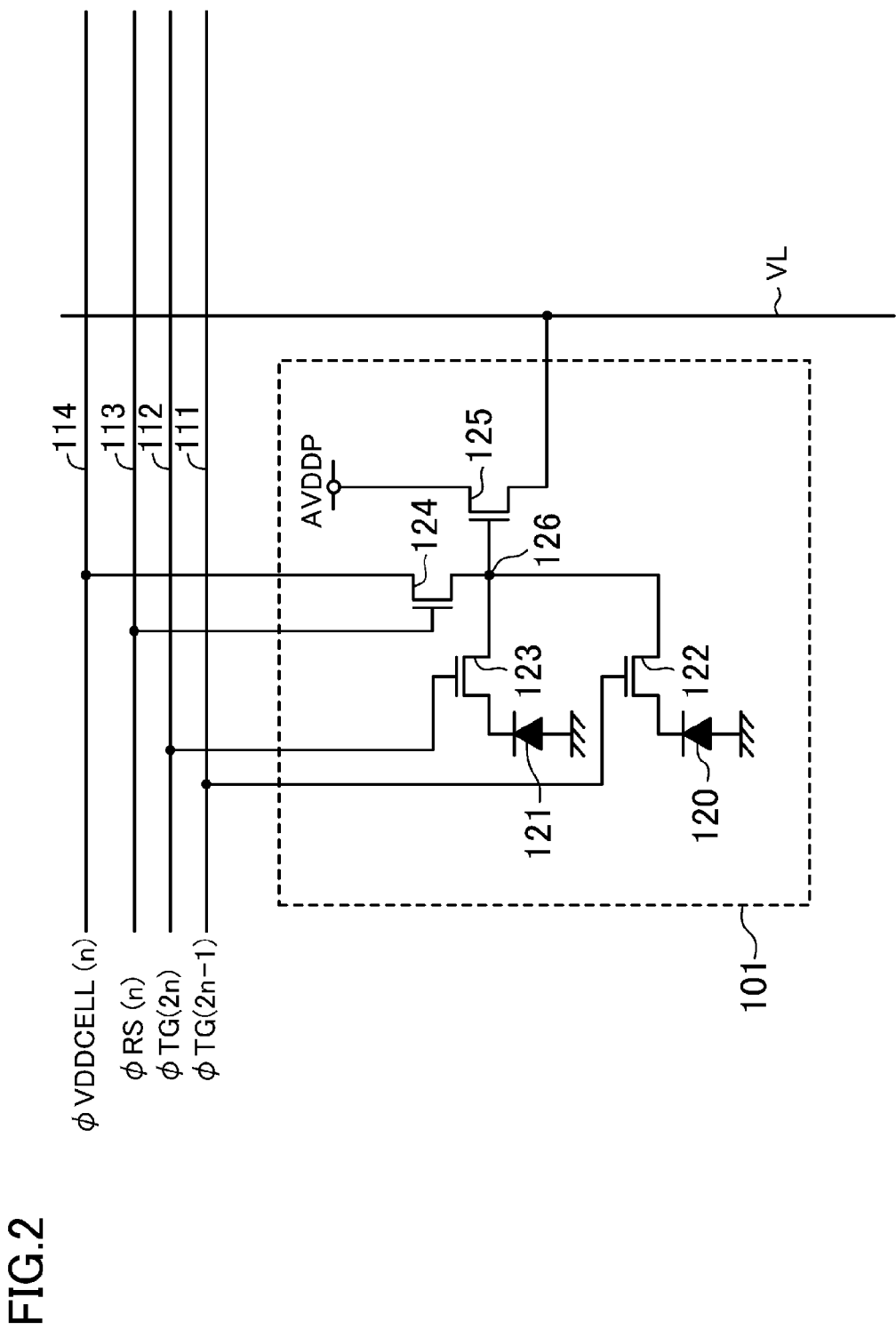
FIG. 2 is a circuit diagram illustrating one example of a circuit configuration of a pixel cell in the solid-state imaging device of the first embodiment.

FIG. 2 is a circuit diagram illustrating one example of a circuit configuration of the pixel cell 101. Referring to FIG. 2, the pixel cell 101 includes elements, such as photodiodes 120, 121, each configured to perform electric conversion, transfer transistors 122, 123, a reset transistor 124, and an amplifier transistor 125. For example, N-channel MOS transistors can be used as the transfer transistors 122, 123, the reset transistor 124, and the amplifier transistor 125.

The transfer transistor 122 is connected between a cathode electrode of the photodiode 120 and a floating diffusion (FD) 126. Similarly, the transfer transistor 123 is connected between a cathode electrode of the photodiode 121 and the FD 126. That is, in the present embodiment, e.g., the circuit configuration in which the two transfer transistors 122, 123 are connected to the same FD 126 is employed.

A transfer control line 111 is connected to a gate electrode of the transfer transistor 122, and a transfer control line 112 is connected to a gate electrode of the transfer transistor 123. When a transfer pulse $\phi TG(2n-1)$ is provided to the gate electrode of the transfer transistor 122 through the transfer control line 111, the transfer transistor 122 is turned on, and a signal charge (specifically electrons) photoelectrically converted and stored at the photodiode 120 is transferred to the FD 126. When a transfer pulse $\phi TG(2n)$ is provided to the gate electrode of the transfer transistor 123 through the transfer control line 112, the transfer transistor 123 is turned on, and a signal charge photoelectrically converted and stored at the photodiode 121 is transferred to the PD 126.

The reset transistor 124 is, at a gate electrode thereof, connected to a reset control line 113, and is, at a drain electrode thereof, connected to a reset power-supply line 114 configured to supply a reset power-supply voltage $\phi VDDCELL(n)$ for pixel. Moreover, the reset transistor 124 is, at a source electrode thereof, connected to the FD 126. When a reset pulse $\phi RS(n)$ is provided to the gate electrode of the reset transistor 124 through the reset control line 113 before the signal charge is transferred from the photodiode 120 to the FD 126, the reset transistor 124 is turned on. Then, the potential of the FD 126 is reset to a reset power-supply potential Vdd, i.e., the potential of a reset power-supply (reset power-supply voltage) $\phi VDDCELL(n)$ for pixel.

The amplifier transistor 125 is, at a gate electrode thereof, connected to the FD 126, and is, at a drain electrode thereof, connected to a pixel power-supply voltage AVDDP. Moreover, the amplifier transistor 125 is, at a source electrode thereof, connected to the vertical signal line VL. The amplifier transistor 125 outputs, as a reset level, the potential of the FD 126 reset by the reset transistor 124 to the vertical signal line VL. Further, the amplifier transistor 125 outputs, as a signal level, a voltage corresponding to the potential of the FD 126 after transfer of the signal charges by the transfer transistors 122, 123 to the vertical signal line VL.

Note that the transfer pulse $\phi TG$, the reset pulse $\phi RS$, and the reset power-supply voltage $\phi VDDCELL$ are supplied from the driver circuit 103.

Figure 3:
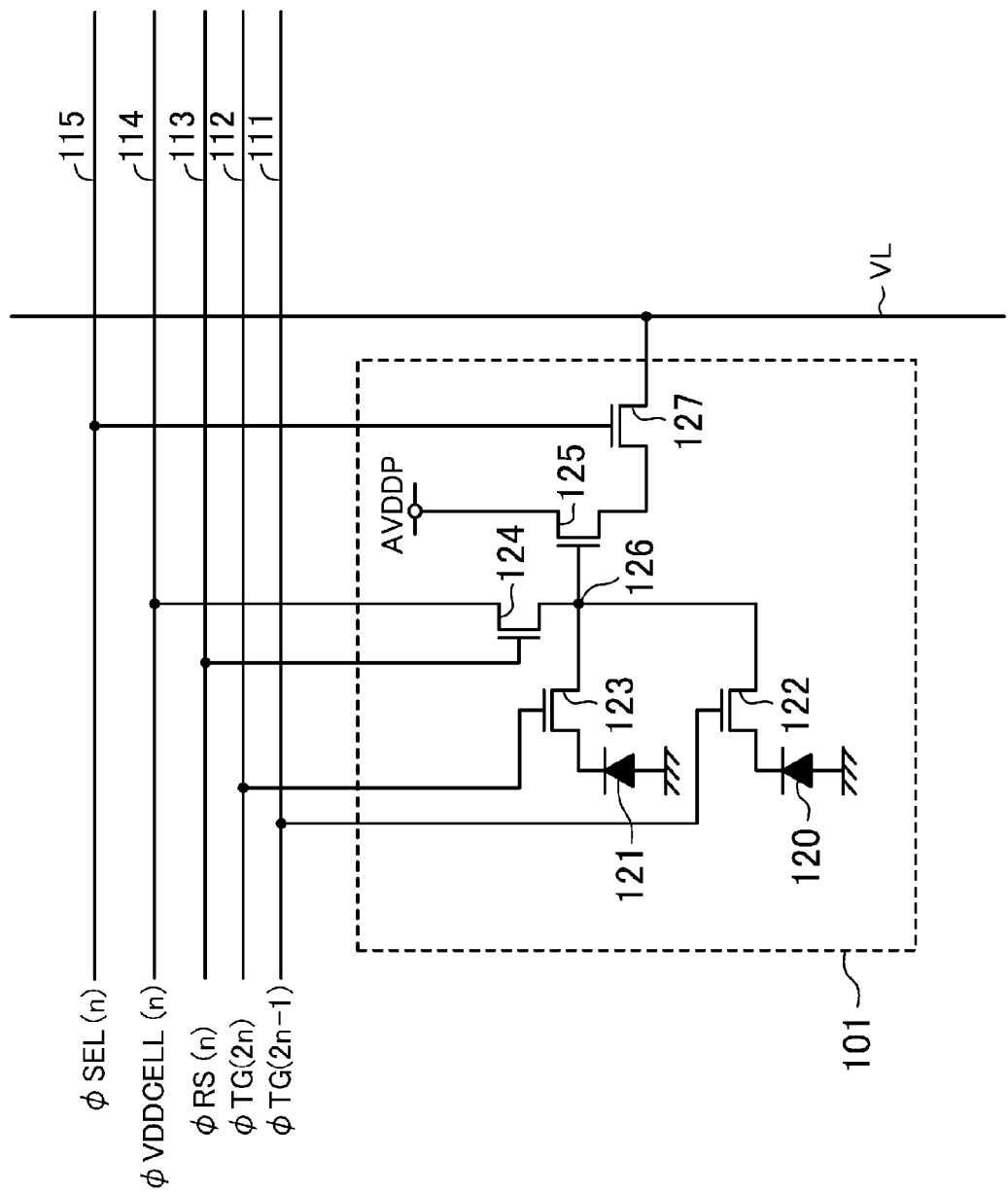
FIG. 3 is a circuit diagram illustrating another example of the circuit configuration of the pixel cell in the solid-state imaging device of the first embodiment.

FIG. 3 is a circuit diagram illustrating another example of the circuit configuration of the pixel cell 101. The same reference numerals as those shown in the circuit illustrated in FIG. 2 are used to represent equivalent elements in FIG. 3, and the description thereof will not be repeated. Differences from the circuit illustrated in FIG. 2 will be mainly described below.

The voltage AVDDP of a pixel power supply is applied to the drain electrode of the amplifier transistor 125, and a drain electrode of a selection transistor 127 is connected to the source electrode of the amplifier transistor 125. A gate electrode of the selection transistor 127 is connected to a selection control line 115, and a selection pulse $\phi SEL(n)$ is provided through the selection control line 115. The vertical signal line VL is connected to a source electrode of the selection transistor 127, and a pixel signal amplified at the amplifier transistor 125 is output to the vertical signal line VL through the selection transistor 127.

In the present embodiment, the configuration in which two photodiodes and two transfer transistors are provided are used for the pixel cell 101, but the present disclosure is not limited to such a configuration. The configuration in which a single photodiode and a single transfer transistor are provided or the configuration in which four photodiodes and four transfer transistors are provided may be used. In the examples illustrated in FIGS. 2 and 3, the sources of the reset power-supply voltage $\phi VDDCELL$ and the pixel power-supply voltage are separated from each other. However, such sources may be connected together.

Figure 4:
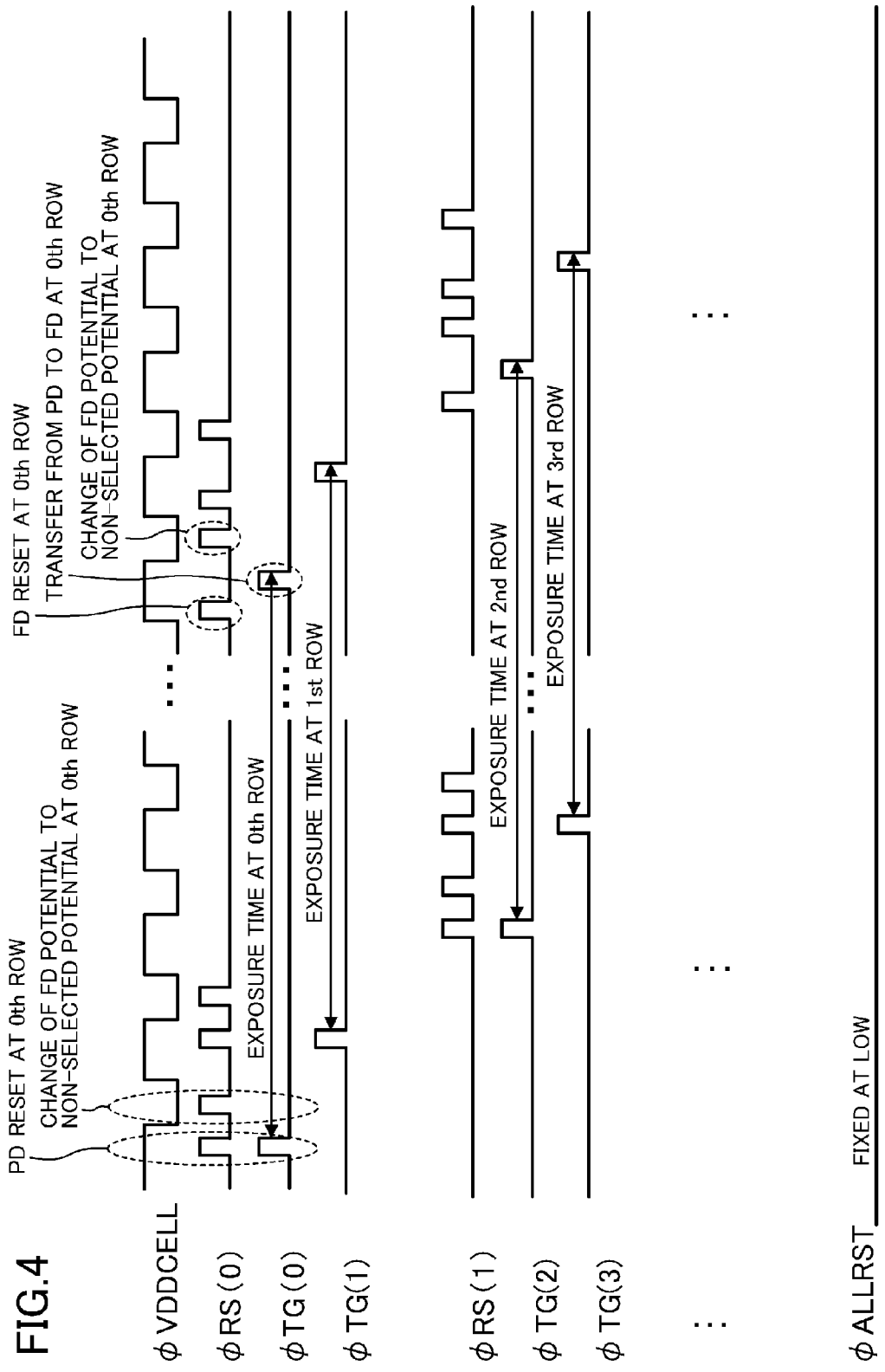
FIG. 4 is a timing chart illustrating operation of a rolling shutter method in the solid-state imaging device for which the pixel cell illustrated in FIG. 2 is employed.

FIG. 4 is a timing chart illustrating operation using a rolling shutter method in a solid-state imaging device for which a so-called "3Tr-type pixel circuit" as illustrated in FIG. 2 is employed.

Operation of each pixel in the case where imaging is performed in a solid-state imaging device for which a 3Tr-type pixel cell 101 is employed is controlled in the following order: reset of the PD/change of an FD potential to a non-selected potential, exposure, reset of the FD and signal reading, transfer of a charge from the PD to the FD and signal reading, and change of the FD potential to the non-selected potential.

In the 3Tr-type pixel cell 101, e.g., the photodiode 120 and the FD 126 at a 2n-1th row are electrically separated from each other by the transfer transistor 122. When the photodiode 120 is reset, it is necessary to turn on not only the reset transistor 124 but also the transfer transistor 122. Upon change of the FD potential to the non-selected potential, the reset power-supply voltage $\phi VDDCELL$ for pixel is at a low (L) level. The amplifier transistor 125 is turned off in such a manner that an L-level signal of the reset power-supply voltage φVDDCELL is written in the FD 126 with the reset transistor 124 being turned on. It is necessary to similarly perform such operation even after pixel reading. Note that an all reset pulse φALLRST used for performing all reset operation is fixed at the L level in the rolling shutter method.

Figure 5:
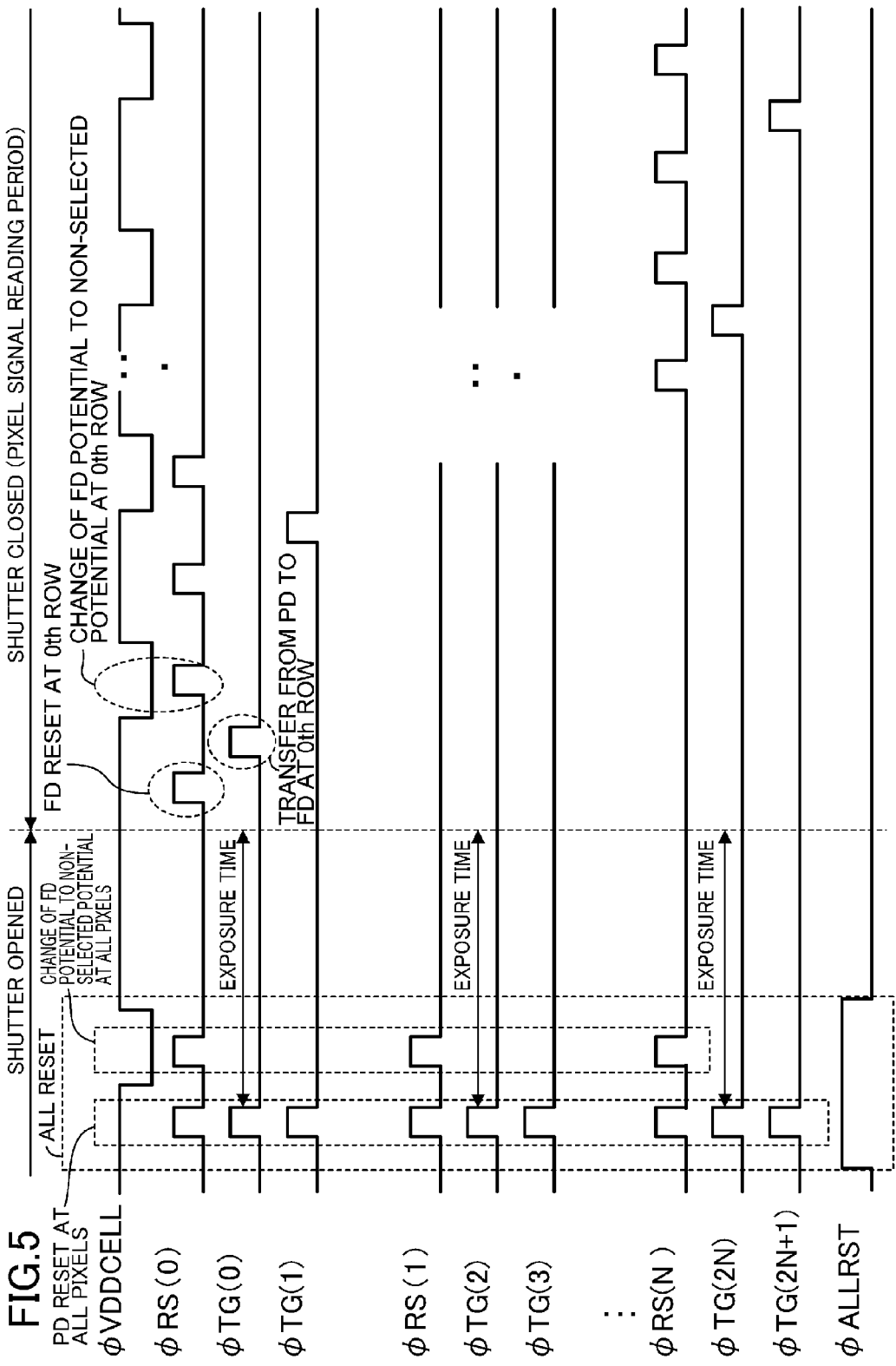
FIG. 5 is a timing chart illustrating operation of a global shutter method using a liquid crystal shutter or a mechanical shutter in the solid-state imaging device of the first embodiment.

FIG. 5 is a timing chart illustrating operation using a global shutter method in which the solid-state imaging device for which the 3Tr-type pixel cell 101 is employed and a liquid crystal shutter or a mechanical shutter are combined together.

In this case, the all reset operation for simultaneously resetting the PDs of all pixels is performed with the shutter being opened, and exposure of all pixels is simultaneously performed in such a manner that the liquid crystal shutter or the mechanical shutter is closed.

In order to reset the PDs in the 3Tr-type pixel cell 101, it is necessary to simultaneously change the reset pulses φRS and the transfer pulses φTG for all pixels to a high (H) level. Thus, referring to FIG. 5, the reset pulses φRS and the transfer pulses φTG for all pixels are simultaneously switched upon reset of the PDs of all pixels. Note that the pulses may be controlled such that the set pulse φRS overlaps with the transfer pulse φTG.

Subsequently, in change of the FD potential to the non-selected potential, the reset power-supply voltage φVDDCELL for pixels of all rows is changed to the L level, and the reset transistors 124 of all rows are turned on. Thus, an L-level signal of the reset power-supply voltage φVDDCELL is written in the FDs of all pixel cells. As a result, the amplifier transistors 125 are turned off. Note that the PDs of all pixels are simultaneously reset, and the all reset pulse φALLRST is maintained at the H level by the TG circuit 109 until the potentials of the FDs 126 of all pixels are changed to the non-selected potential. After the potentials of the FDs 126 are changed to the non-selected potential, the all reset pulse φALLRST is changed to the L level. Then, the shutter is closed, and an exposure time is elapsed. Subsequently, the FD 126 is reset, and then the charge stored at the PD is transferred to the FD. Reading of a signal from the pixel is successively performed for each row. That is, reading operation is similar to the rolling shutter method.

Figure 6:
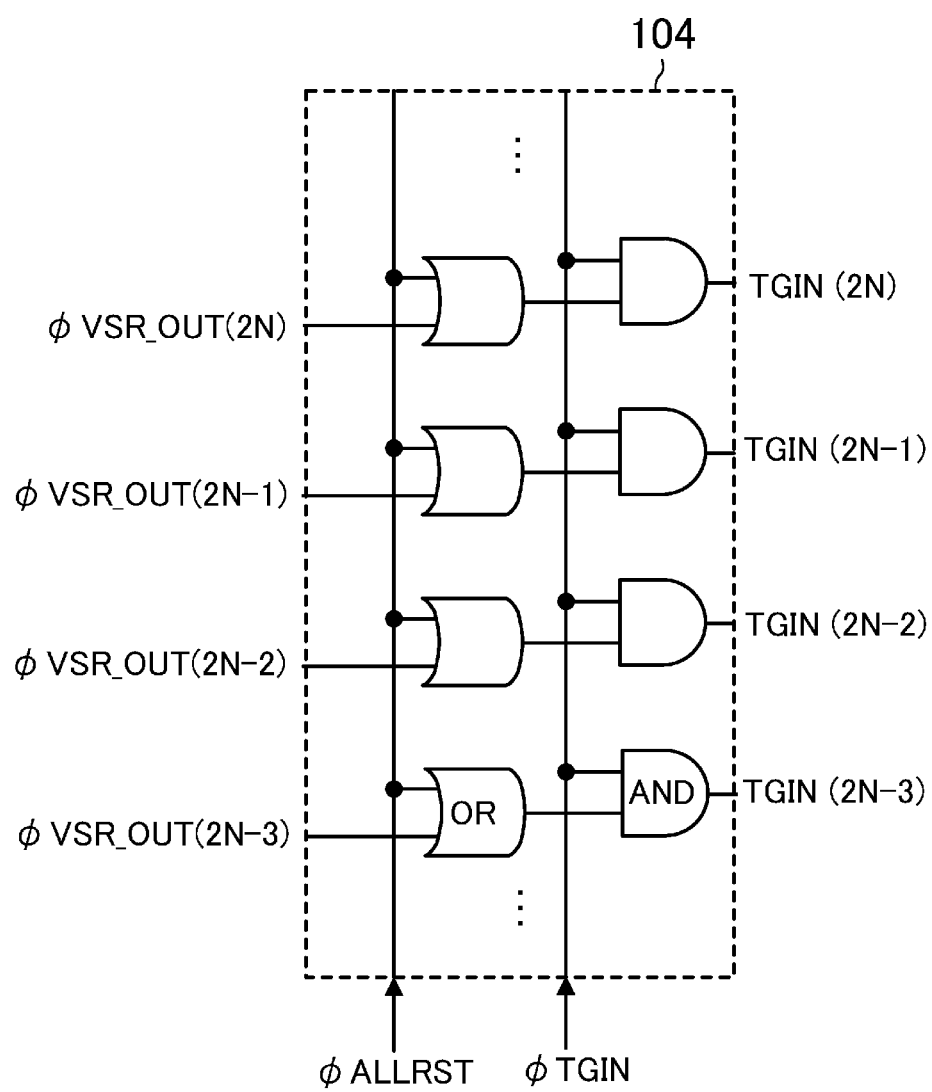
FIG. 6 is a diagram illustrating one example of an MPX circuit which is for a transfer pulse and which is configured to control a driver circuit in the solid-state imaging device of the first embodiment.

FIG. 6 is a diagram illustrating one example of an MPX circuit which is for a transfer pulse and which is configured to control the driver circuit 103 in the solid-state imaging device of the present embodiment.

Referring to FIG. 6, the MPX circuit 104 for transfer pulse includes an AND circuit and an OR circuit corresponding to each row of the pixels. Row selection pulses φVSR_OUT (2N), φVSR_OUT(2N−1), . . . output from the vertical scanning circuit 105 are input to the MPX circuit 104 for transfer pulse, and the all reset pulse φALLRST and a transfer pulse φTGIN output from the TG circuit 109 are input to the MPX circuit 104 for transfer pulse. Suppose that a 2Nth row is a reading row. An H-level signal of the row selection pulse φVSR_OUT(2N) is output, and the transfer pulse φTGIN is changed to the H level. Then, an H-level signal is output through a transfer pulse output line TGIN(2N). In the rows other than the 2Nth row, L-level signals are output through transfer pulse output lines.

In the all reset operation, when the all reset pulse φALLRST is changed to the H level, and the transfer pulse φTGIN is changed to the H level, H-level signals are output through the transfer pulse output lines TGIN of all rows.

Figure 7:
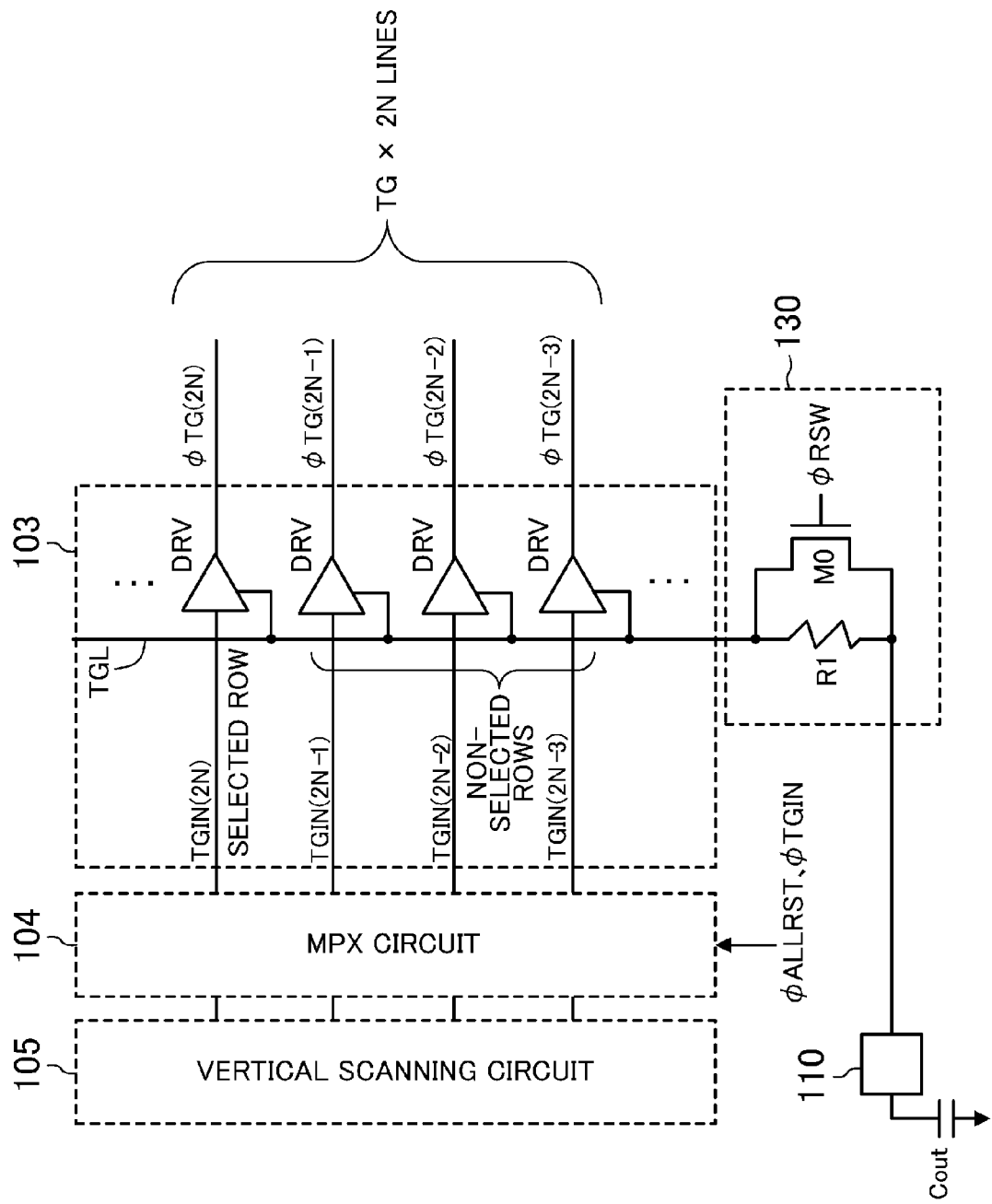
FIG. 7 is a diagram illustrating one example of a circuit configured to drive a transfer transistor of a pixel part in the solid-state imaging device of the first embodiment.

FIG. 7 is a diagram illustrating one example of a circuit configured to drive the transfer transistor of the pixel part according to the present embodiment. FIG. 7 illustrates the driver circuit 103, the MPX circuit 104, the vertical scanning circuit 105, an impedance switcher circuit (impedance controller) 130, the PAD 110 for power supply terminal, and an external capacitor Cout provided outside a chip of the solid-state imaging device. A row selection pulse φVST_OUT is input from the vertical scanning circuit 105 to the MPX circuit 104, and a selected row and non-selected rows are determined (see FIG. 6). The all reset pulse φALLRST is input from the TG circuit 109 to the MPX circuit 104 in the all reset operation, and the transfer pulse φTGIN for controlling the transfer transistor is input to the MPX circuit 104.

A buffer circuit DRV of the driver circuit 103 is arranged for each row, and a power-supply line for L-level signal of the buffer circuit DRV is connected to the impedance switcher circuit 130. The impedance switcher circuit 130 is connected to the external capacitor Cout through the PAD 110 for power supply terminal. Each of the transfer pulse output lines TGIN (2N), TGIN(2N−1), . . . is connected to a corresponding one of input ends of the buffer circuits DRV. Each of the transfer pulses φTG(2N), φTG(2N−1), . . . is output through a corresponding one of output ends of the buffer circuits DRV.

The impedance switcher circuit 130 includes a resistive element (impedance element) R1 and a transistor M0 connected together in parallel. An impedance switching control pulse φRSW is input to a gate electrode of the transistor M0. The impedance switching control pulse φRSW is at the L level in the all reset operation. A resistance value in the impedance switcher circuit 130 increases in such a manner that current flows only through the resistive element R1 in the impedance switcher circuit 130 in a current path from the control line (i.e., the transfer control line 111, 112) for pixel cell 101 to the power supply terminal (i.e., the PAD 110). As a result, an excessive instantaneous current flow is reduced.

On the other hand, after completion of the all reset operation, the impedance switching control pulse φRSW is at the H level in the pixel reading operation. The resistance value decreases as compared to that in the all reset operation in such a manner that current flows through both of the resistive element R1 and the transistor M0 in the impedance switcher circuit 130 in the current path from the control line (i.e., the transfer control line 111, 112) for pixel part to the power supply terminal (i.e., the PAD 110). As a result, variation in potential of the control line (i.e., the transfer control line 111, 112) in the foregoing reading operation can be reduced, and therefore occurrence of noise can be reduced. Moreover, since a voltage change can be reduced, the possibility of causing a latch-up can be significantly reduced. In operation other than the all reset operation, such as electronic shutter operation of the rolling shutter method in which signal charges for plural rows of pixels are reset, when transfer pulses φTGIN are input to plural rows of buffer circuits DRV, an impedance switching control pulse φRSW may be temporarily changed from the L level to the H level to reduce an excessive instantaneous current flow.

In the solid-state imaging device of the present embodiment, a common impedance value seen from the control line (i.e., the transfer control line 111, 112) for pixel cell 101 to the power supply terminal (or the power-supply line) in the reading operation is less than that in the all reset operation. The "common impedance value" is an impedance value at a common part between a line from the control line for pixel cell 101 of the row for which reading is performed and a line (and a circuit) from the control line for pixel cell 101 of a certain non-selected row to the power supply terminal.

In other words, according to the solid-state imaging device of the present embodiment, since the impedance switcher circuit 130 is provided, the impedance seen from the control line (i.e., the transfer control line 111, 112 in the present embodiment) for pixel cell 101 can be adjusted to a suitable impedance value in each of the all reset operation and the reading operation. For example, suppose that an attempt is made to reduce, by setting a resistance value at equal to or greater than 100Ω, an excessive instantaneous current in the all reset operation and to reduce, by setting a resistance value at less than 10Ω, variation in potential of the transfer control line 111, 112 in the reading operation. The impedance can be easily adjusted in such a manner that a resistive element having a resistance value of equal to or greater than 100Ω is used as the resistive element R1 and that the resistance value of the transistor M0 is set at less than 10Ω when the transistor M0 is turned on. Moreover, the impedance switcher circuit 130 may be arranged near the driver circuit 103, and is not necessarily arranged for each row. That is, only one impedance switcher circuit 130 may be provided for the driver circuit 103, and therefore a chip area is not increased.

Even if the potential of a power-supply line TGL connected to the buffer circuits DRV is a negative voltage, it is also more likely that an excessive instantaneous current flows through the power-supply line TGL in the all reset operation. Thus, the impedance switcher circuit 130 is an effective measure to reduce an instantaneous current. In such a case, in order to prevent an excessive instantaneous current from concentrating on a single path, a diode element connected in parallel with the resistive element R1 and the transistor M0 may be arranged between a branch point of the power-supply line TGL into the buffer circuit DRV and the PAD 110. A diode element connected between the buffer circuit DRV of the power-supply line TGL and a ground power supply may be arranged. Since the diode is turned on by a potential increase caused by a potential gradient due to a resistive component and an instantaneous current, a path through which an instantaneous current flows into the ground power supply can be formed only when an instantaneous current flows. Thus, paths through each of which an instantaneous current flows can be dispersed, and an excessive instantaneous current flow through a particular line can be reduced.

Note that it is effective that, in each of the driver circuit configured to supply the reset pulse φRS and the driver circuit configured to supply the reset power-supply voltage φVDDCELL for pixel, an impedance switcher circuit may be provided as in the foregoing example.

If no impedance switcher circuit is provided, the control lines (i.e., the transfer control line 111, the reset control line 113, and the reset power-supply line 114) for supplying the transfer pulse φTG, the reset pulse φRS, and the reset power-supply voltage φVDDCELL cross the vertical signal line VL, and therefore a parasitic capacitance is generated between each control line and the vertical signal line VL when a charge is transferred from the PD 121 to the FD 126. Due to the parasitic capacitance generated between the transfer control line 111 and the vertical signal line VL, a decrease in potential of the vertical signal line is transmitted to the transfer control line 111, and therefore the potential of an L-level signal of the transfer pulse φTG decreases. Such variation in potential of the transfer control line 111 occurs in all rows, and therefore the variation in potential is transmitted to the power-supply line through the driver circuit 103. Since the transfer control line 111 is connected to the gate electrode of the transfer transistor 123, there is a gate-source overlap capacitance between the FD 126 and the transfer control line 111. Thus, the variation in potential of the L-level signal of the transfer pulse φTG is transmitted to another FD 126 due to the gate-source overlap capacitance, resulting in swing of the potential of the FD 126. Such swing of the potential of the FD 126 is transmitted to the vertical signal line VL through the amplifier transistor 125, thereby causing noise.

Thus, in order to reduce or prevent transmission of potential variation to the FD 126 of the dark pixel of the selected row due to the parasitic capacitance, it is effective for noise reduction to provide the impedance switcher circuit in each of the driver circuit configured to supply the reset pulse φRS and the driver circuit configured to supply the reset power-supply voltage φVDDCELL for pixel.

Figure 8:
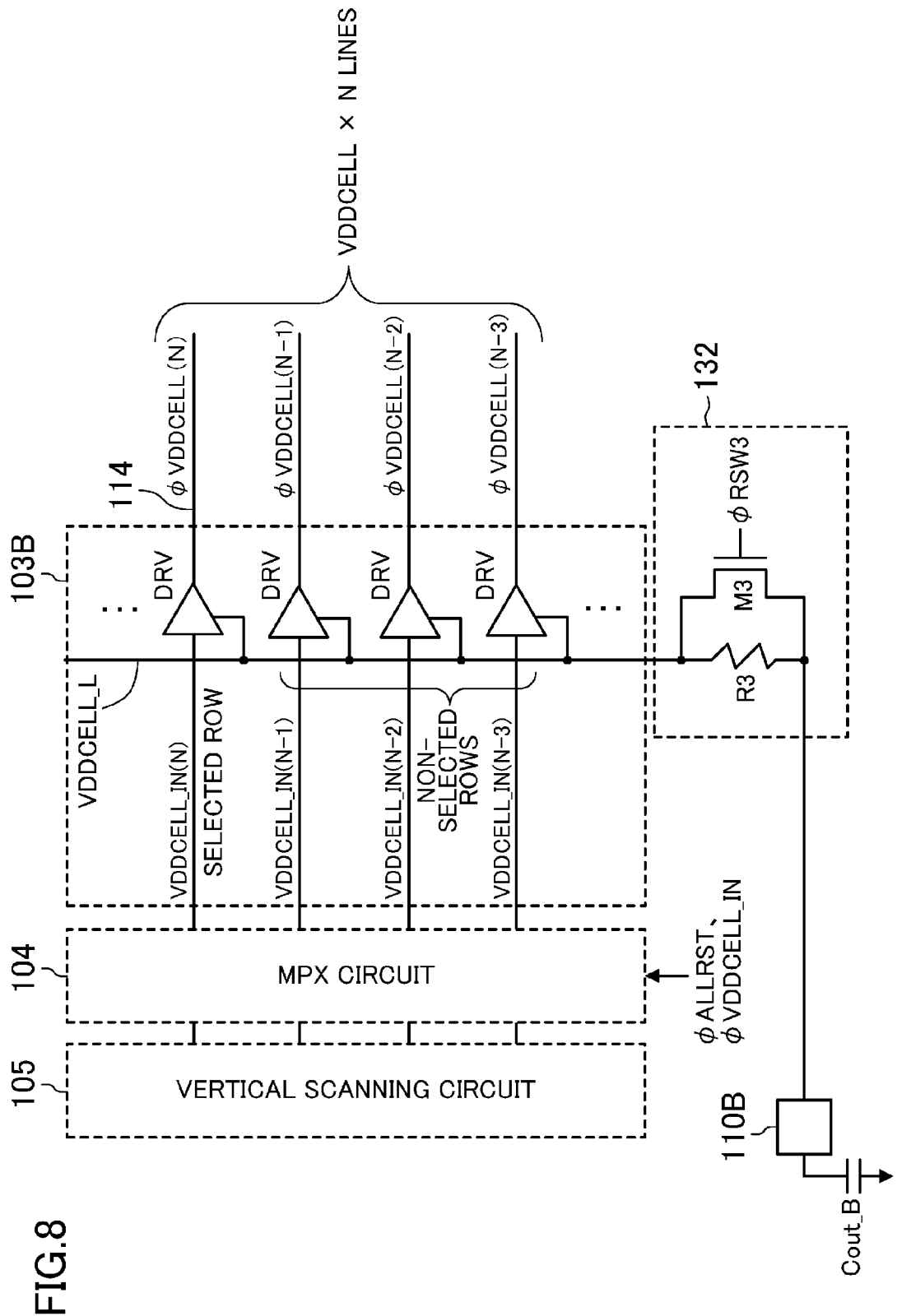
FIG. 8 is a diagram illustrating one example of a circuit configured to supply a reset power-supply voltage $\phi$VDD-CELL of the pixel part in the solid-state imaging device of the first embodiment.

FIG. 8 is a diagram illustrating one example of a circuit configured to supply the reset power-supply voltage φVDDCELL for pixel part according to the present embodiment. A driver circuit 103B illustrated in FIG. 8 is part of the driver circuit 103 illustrated in FIG. 1.

Referring to FIG. 8, the driver circuit 103B includes a plurality of buffer circuits DRV which are provided correspondingly respectively to unit pixel cells and to each of which a corresponding one of signals VDDCELL_IN(N), VDDCELL_IN(N-1), . . . output from the MPX circuit 104 is input. The buffer circuits DRV are connected to a common power-supply line VDDCELL_L. Each of the buffer circuits DRV supplies a corresponding one of reset voltages φVDDCELL(N), φVDDCELL(N-1), . . . to the drain electrode of the reset transistor 124 through the reset power-supply line 114.

The power-supply line VDDCELL_L is connected to a PAD 110B connected to an external capacitor Cout_B, and an impedance switcher circuit 132 having a configuration similar to that of the impedance switcher circuit 130 illustrated in FIG. 7 is provided in part of the power-supply line VDDCELL_L between the PAD 110B and the buffer circuit DRV. That is, the impedance switcher circuit 132 includes a resistive element R3 and a transistor M3 connected together in parallel. Operation of the transistor M3 is controlled by an impedance switching control pulse φRSW3.

The impedance switching control pulse φRSW3 is at the L level in the all reset operation. A resistance value in the impedance switcher circuit 132 increases in such a manner that current flows only through the resistive element R3 in the impedance switcher circuit 132 in a current path from the control line (i.e., the reset power-supply line 114) for pixel cell 101 to the power supply terminal (i.e., the PAD 110B). As a result, an excessive instantaneous current flow is reduced.

On the other hand, after completion of the all reset operation, the impedance switching control pulse φRSW3 is at the H level in the pixel reading operation. The resistance value decreases as compared to that in the all reset operation in such a manner that current flows through both of the resistive element R3 and the transistor M3 in the impedance switcher circuit 132 in the current path from the control line (i.e., the reset power-supply line 114) for pixel part to the power supply terminal (i.e., the PAD 110B). As a result, variation in potential of the control line (i.e., the reset power-supply line 114) in the foregoing reading operation can be reduced, and therefore occurrence of noise can be reduced. Moreover, since a voltage change can be reduced, the possibility of causing a latch-up can be significantly reduced.

Figure 9:
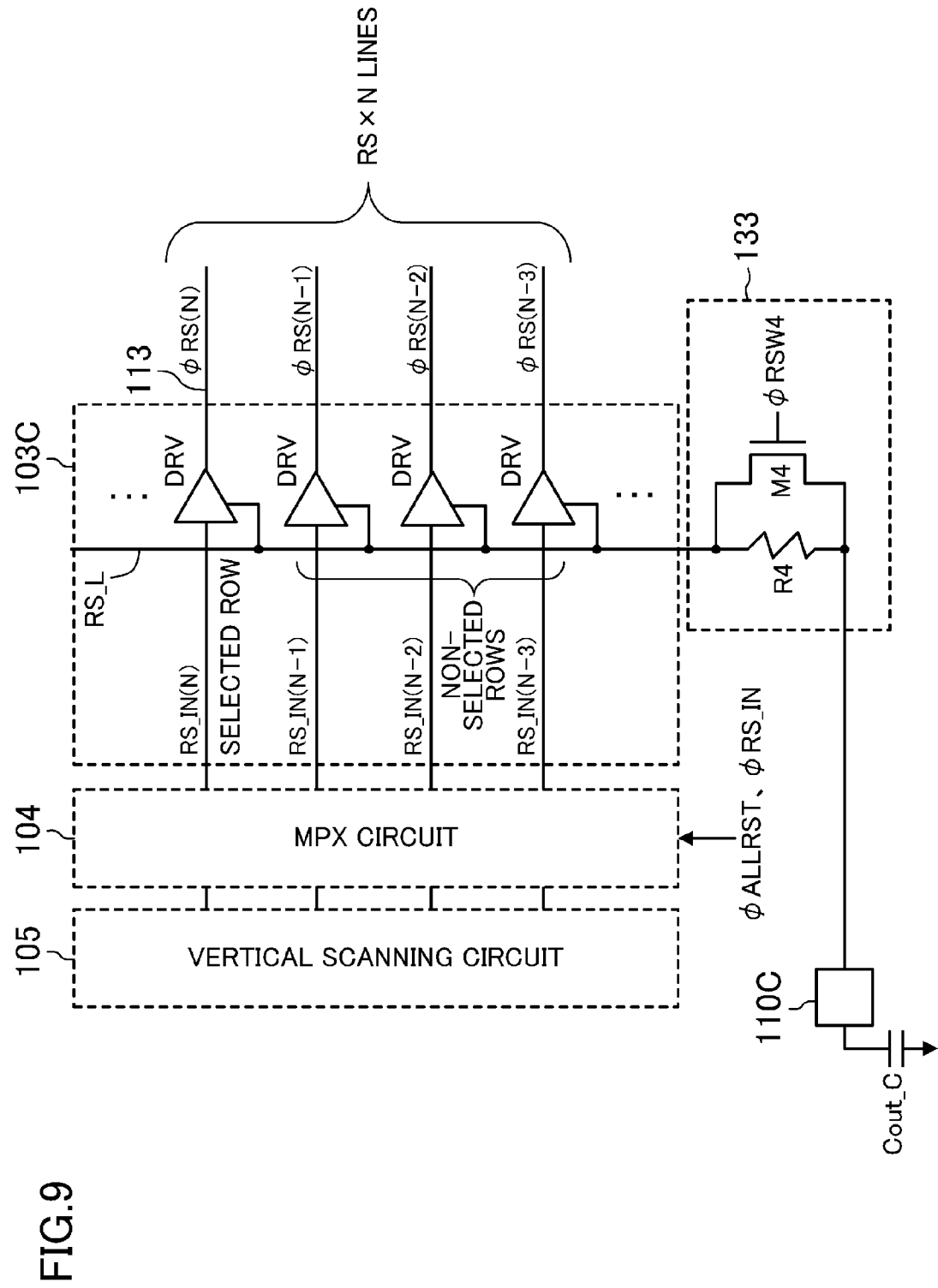
FIG. 9 is a diagram illustrating one example of a circuit configured to supply a reset pulse $\phi$RS of the pixel part in the solid-state imaging device of the first embodiment.

FIG. 9 is a diagram illustrating one example of a circuit configured to supply the reset pulse φRS for pixel part according to the present embodiment. A driver circuit 103C illustrated in FIG. 9 is part of the driver circuit 103 illustrated in FIG. 1.

Referring to FIG. 9, the driver circuit 103C includes a plurality of buffer circuits DRV which are provided correspondingly respectively to unit pixel cells and to each of which a corresponding one of signals RS_IN(N), RS_IN(N-1), . . . output from the MPX circuit 104 is input. The buffer circuits DRV are connected to a common power-supply line RS_L. Each of the buffer circuits DRV supplies a corresponding one of reset pulses φRS(N), φRS(N−1), . . . to the gate electrode of the reset transistor 124 through the reset power-supply line 114.

The power-supply line RS_L is connected to a PAD 110C connected to an external capacitor Cout_C, and an impedance switcher circuit 133 having a configuration similar to that of the impedance switcher circuit 130 illustrated in FIG. 7 is provided in part of the power-supply line RS_L between the PAD 110C and the buffer circuit DRV. That is, the impedance switcher circuit 133 includes a resistive element R4 and a transistor M4 connected together in parallel. Operation of the transistor M4 is controlled by an impedance switching control pulse φRSW4.

The impedance switching control pulse φRSW4 is at the L level in the all reset operation. A resistance value in the impedance switcher circuit 133 increases in such a manner that current flows only through the resistive element R4 in the impedance switcher circuit 133 in a current path from the control line (i.e., the reset control line 113) for pixel cell 101 to the power supply terminal (i.e., the PAD 110C). As a result, an excessive instantaneous current flow is reduced.

On the other hand, after completion of the all reset operation, the impedance switching control pulse φRSW4 is at the H level in the pixel reading operation. The resistance value decreases as compared to that in the all reset operation in such a manner that current flows through both of the resistive element R4 and the transistor M4 in the impedance switcher circuit 133 in the current path from the control line (i.e., the reset control line 113) for pixel part to the power supply terminal (i.e., the PAD 110C). As a result, variation in potential of the control line (i.e., the reset control line 113) in the foregoing reading operation can be reduced, and therefore occurrence of noise can be reduced. Moreover, since a voltage change can be reduced, the possibility of causing a latch-up can be significantly reduced.

As described above, since the impedance switcher circuit is provided, the common impedance value between the control line (i.e., the reset control line 113 or the reset power-supply line 114) for pixel cell 101 and the power supply terminal (or the power-supply line) in the reading operation is less than that in the all reset operation. That is, the impedance value of the power-supply line in the reading operation is less than that in the all reset operation.

The global shutter method in which the all reset operation is performed is mainly used to obtain a still image, and the resistance value of the impedance switcher circuit 130 is controlled to be greater in the all reset operation. When a moving picture is obtained, the rolling shutter method is employed as shutter operation. In such a case, since the pixel cells are accessed for each row as in the pixel reading operation, the resistance value of the impedance switcher circuit 130 is controlled to be less than that in the all reset operation.

Figure 10:
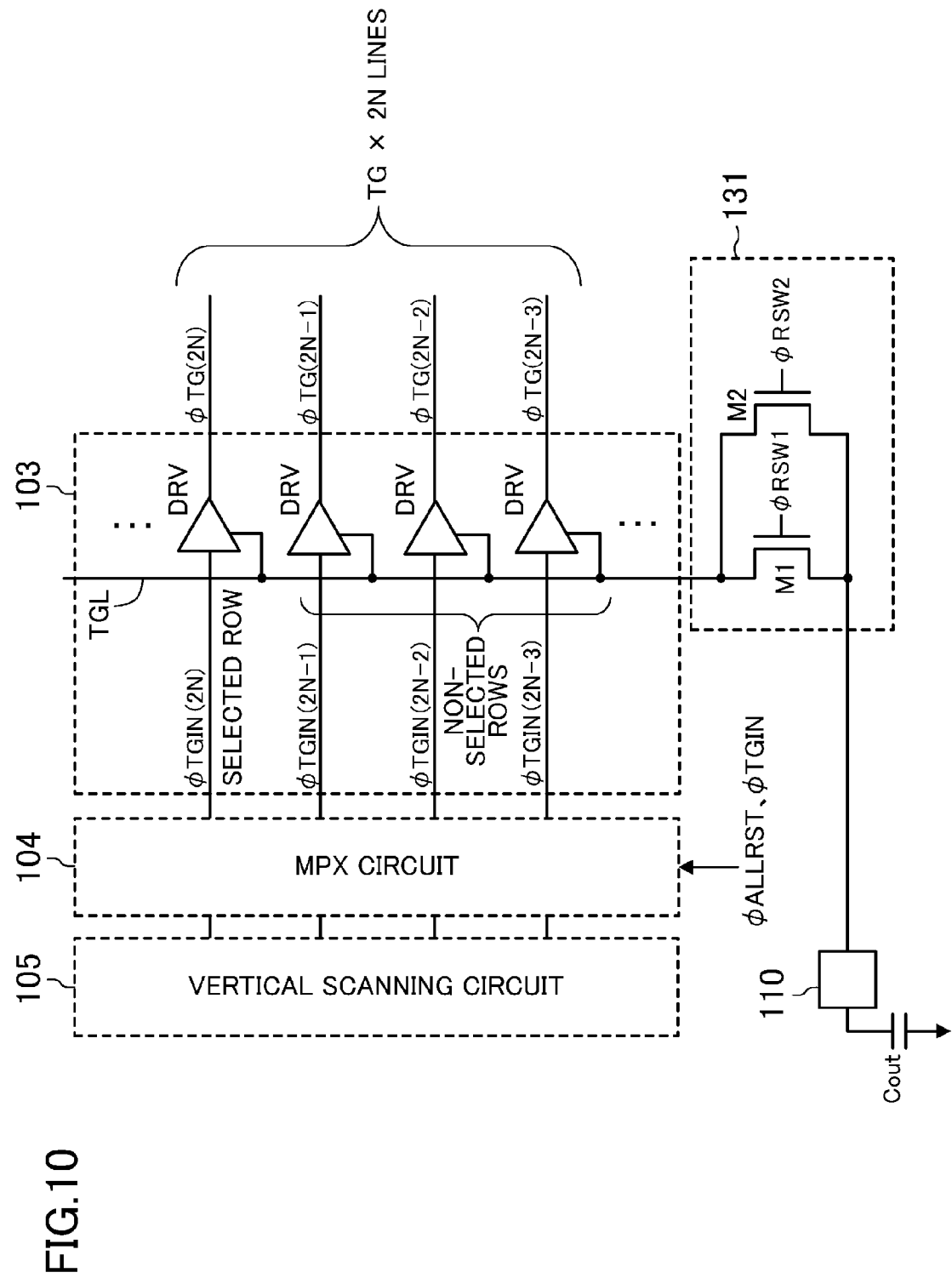
FIG. 10 is a diagram illustrating another example of the circuit configured to drive the transfer transistor of the pixel part in the solid-state imaging device of the first embodiment.

FIG. 10 is a diagram illustrating another example of the circuit configured to drive the transfer transistor of the pixel part according to the present embodiment. Note that the same reference numerals as those shown in the circuit illustrated in FIG. 7 are used to represent equivalent elements in FIG. 10, and the description thereof will not be repeated. Differences from the circuit illustrated in FIG. 7 will be mainly described.

In the variation illustrated in FIG. 10, an impedance switcher circuit 131 is configured such that a transistor M1 and a transistor M2 are connected together in parallel. An impedance switching control pulse φRSW1 is input to a gate electrode of the transistor M1, and an impedance switching control pulse φRSW2 is input to a gate electrode of the transistor M2.

In the all reset operation, e.g., the impedance switching control pulse φRSW1 is changed to the H level to turn on the transistor M1, and, e.g., the impedance switching control pulse φRSW2 is changed to the L level to turn off the transistor M2. Thus, a resistance value of the impedance switcher circuit 131 increases, and an instantaneous current is controlled by the impedance switcher circuit 131. As a result, an excessive instantaneous current flow through the power-supply line TGL can be reduced.

In the reading operation, the resistance value of the impedance switcher circuit 131 is reduced in such a manner that the impedance switching control pulses φRSW1, φRSW2 are changed to the H level to turn on the transistors M1, M2. This reduces the foregoing swing of the potential of the control line (i.e., the transfer control line 111, 112) in the reading operation, and therefore occurrence of noise can be reduced.

Although the example where there are two current paths in the impedance switcher circuit 130, 131 is illustrated in each of FIGS. 7 and 10, three or more current paths may be formed.

The example where the pixel cell 101 includes two PDs has been described above. However, only a single PD or three or more PDs may be provided for the pixel cell. If three or more PDs are provided, such PDs may be connected to a common ED.

(Second Embodiment)

A solid-state imaging device of a second embodiment of the present disclosure will be described with reference to drawings. Note that differences from the solid-state imaging device of the first embodiment will be mainly described.

Figure 11:
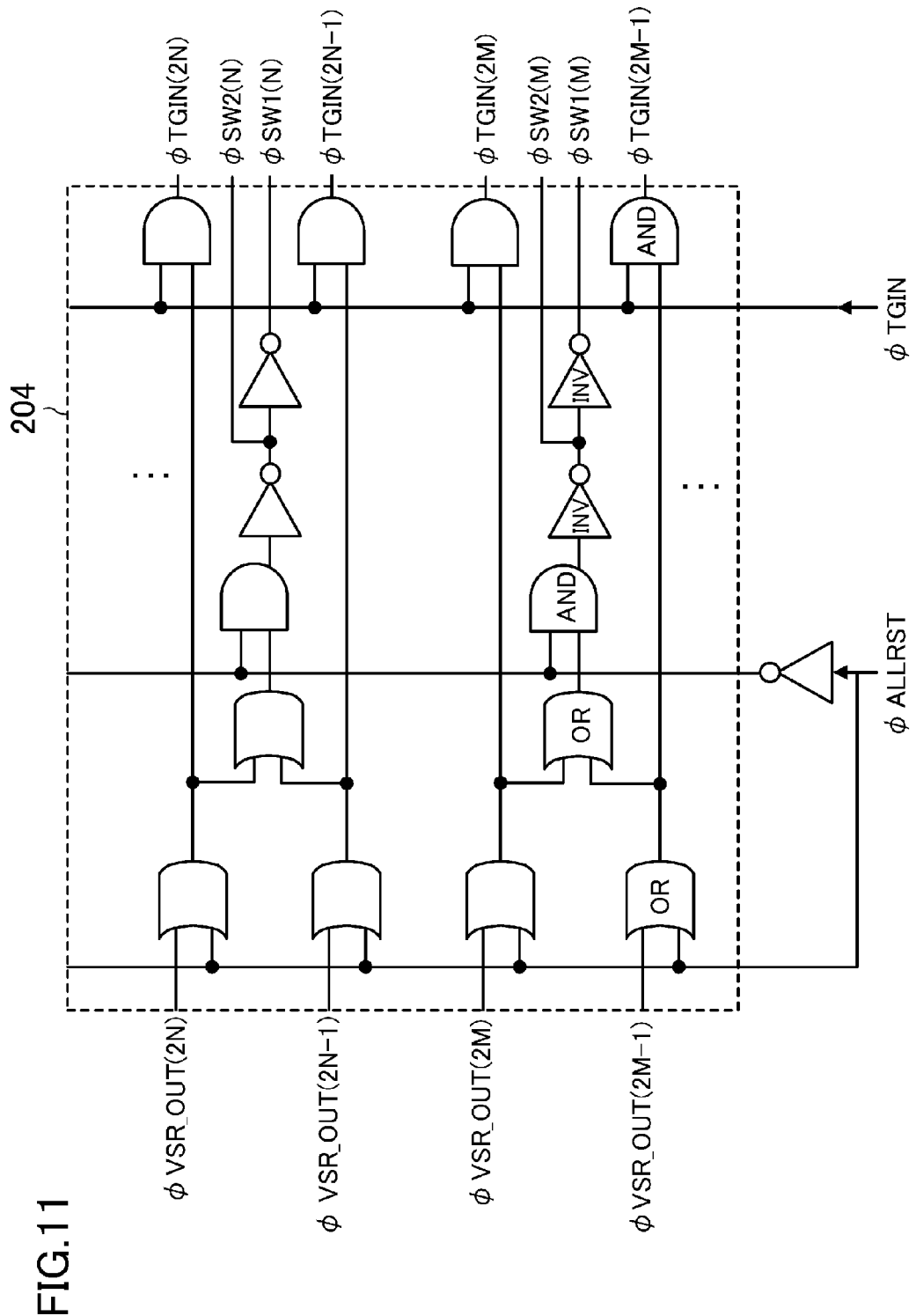
FIG. 11 is a diagram illustrating one example of an MPX circuit which is for a transfer pulse and which is configured to drive a driver circuit in a solid-state imaging device of a second embodiment.

FIG. 11 is a diagram illustrating one example of an MPX circuit 204 which is for a transfer pulse and which is configured to control a driver circuit 203 in the solid-state imaging device of the second embodiment.

Referring to FIG. 11, the MPX circuit 204 for transfer pulse includes a plurality of OR circuits each provided for a corresponding one of transfer control lines. For each of the OR circuits, an OR circuit connected in series with an output end of the OR circuit, an AND circuits, and two INV circuits are provided. Row selection pulses φVSR_OUT(2N), φVSR_OUT(2N−1), φVSR_OUT(2M), φVSR_OUT(2M−1) are input from a vertical scanning circuit 105 to the MPX circuit 204, and an all reset pulse φALLRST and a transfer pulse φTGIN are input from a TG circuit 109 to the MPX circuit 204.

If a 2Nth row is a reading row in pixel reading operation, the all reset pulse φALLRST is at an L level, the row selection pulse φVSR_OUT(2N) is at an H level, and the transfer pulse φTGIN is at the H level. In such a state, an H-level signal is output through a transfer pulse output line TGIN(2N). In rows other than the foregoing, L-level signals are output through transfer pulse output lines. In such a state, for impedance switching control pulses φSW1, φSW2 of the driver circuit 203, an impedance switching control pulse φSW1(N) is at the H level at the 2Nth row, i.e., the reading row, and an impedance switching control pulse φSW2(N) is at the L level at the 2Nth row.

In all reset operation, H-level signals are output through all transfer pulse output lines TGIN in such a manner that an H-level signal is output as the all reset pulse φALLRST and an H-level signal is output as the transfer pulse φTGIN. In such a state, at all rows, the impedance switching control pulse φSW1 of the driver circuit 203 is at the L level, and the impedance switching control pulse φSW2 of the driver circuit 203 is at the H level.

Figure 12:
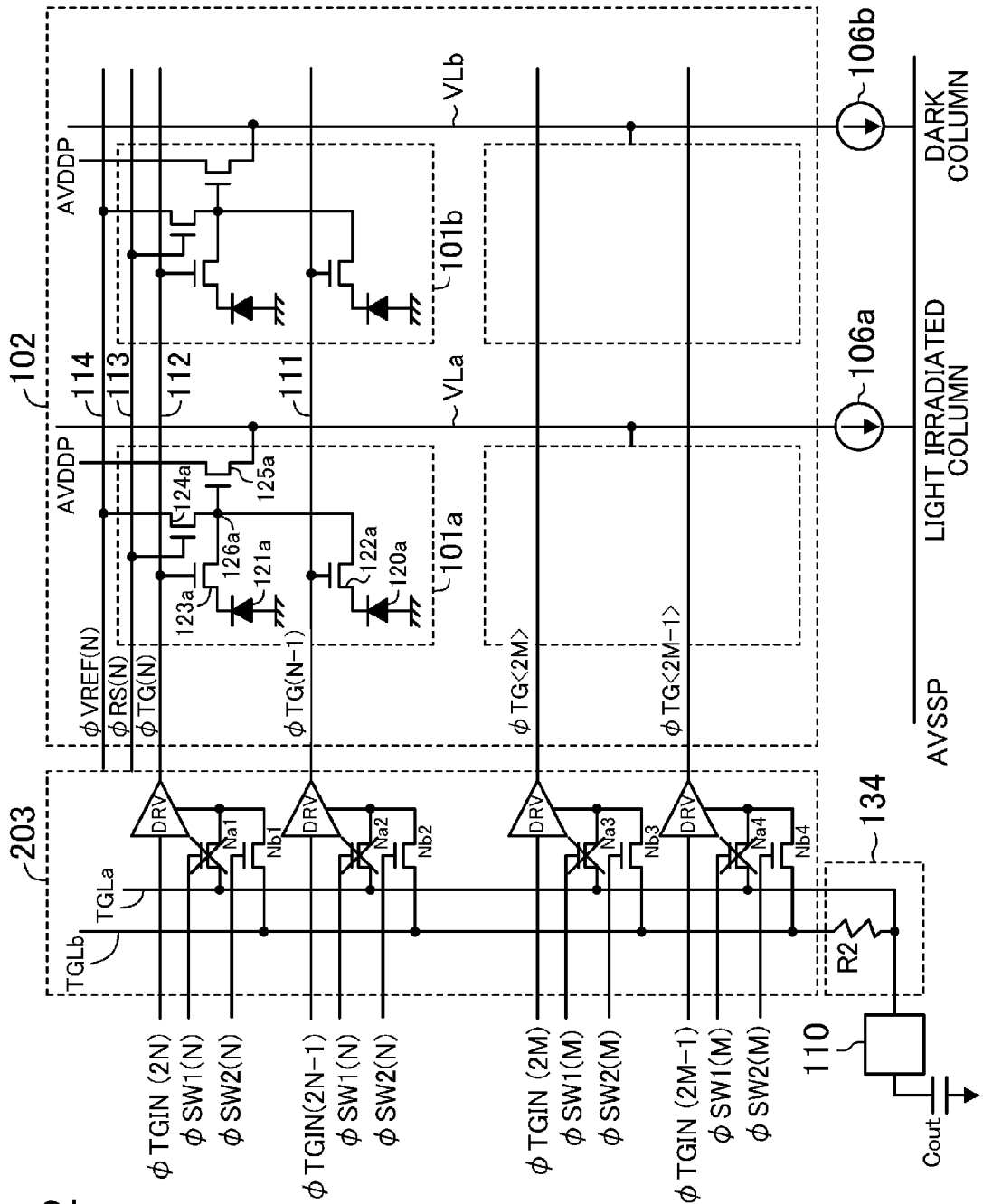
FIG. 12 is a diagram illustrating one example of a pixel array and the driver circuit in the solid-state imaging device of the second embodiment.

FIG. 12 is a diagram illustrating one example of a pixel array 102 and the driver circuit 203 in the solid-state imaging device of the second embodiment of the present disclosure. FIG. 12 illustrates the all reset operation. In FIG. 12, a pixel cell at a light irradiated column is a pixel cell 101a, a constant current source at the light irradiated column is a constant current source 106a, a pixel cell at a dark column is a pixel cell 101b, and a constant current source at the dark column is a constant current source 106b.

FIG. 12 illustrates the pixel array 102, the driver circuit 203, an impedance switcher circuit 134 including a resistive element (impedance element) R2, a PAD 110 for power supply terminal, an external capacitor Cout, and the constant current sources 106a, 106b. A buffer circuit DRV of the driver circuit 203 is arranged for each row, and two paths, i.e., two power-supply lines TGLa, TGLb for L-level signal of the buffer circuit DRV, are provided.

For example, the buffer circuit DRV to which a transfer pulse ϕTGIN(2N) is supplied is connected to the power-supply line TGLa through a transistor (switch) Na1, and is connected to the power-supply line TGLb through a transistor (switch) Nb1. The impedance switching control pulse ϕSW1 output from the MPX circuit 204 is input to a gate electrode of the transistor Na1, and the impedance switching control pulse ϕSW2 is input to a gate electrode of the transistor Nb1.

The resistive element R2 is provided in part of the power-supply line TGLb for L-level signal of the buffer circuit DRV between a branch point of the power-supply line TGLb into the transistor and the PAD 110 for power supply terminal.

In the all reset operation, the impedance switching control pulse ϕSW1 is at the L level, and the transistor Na connected to the power-supply line TGLa is turned off. Moreover, the impedance switching control pulse ϕSW2 is at the H level, and the transistor Nb connected to the power-supply line TGLb is turned on. Thus, since the potential of the L-level signal of the buffer circuit DRV is, in the all reset operation, supplied through the power-supply line TGLb connected to the resistive element R2 connected to the PAD, an excessive instantaneous current flow can be reduced by the resistive element R2. Note that the transistor may be used as a resistive element to limit an instantaneous current. This is not limited to the driver circuit for transfer pulse, and the similar configuration is also effective for a driver circuit for reset pulse ϕRS and a driver circuit for reset power-supply voltage ϕVDDCELL.

Figure 13:
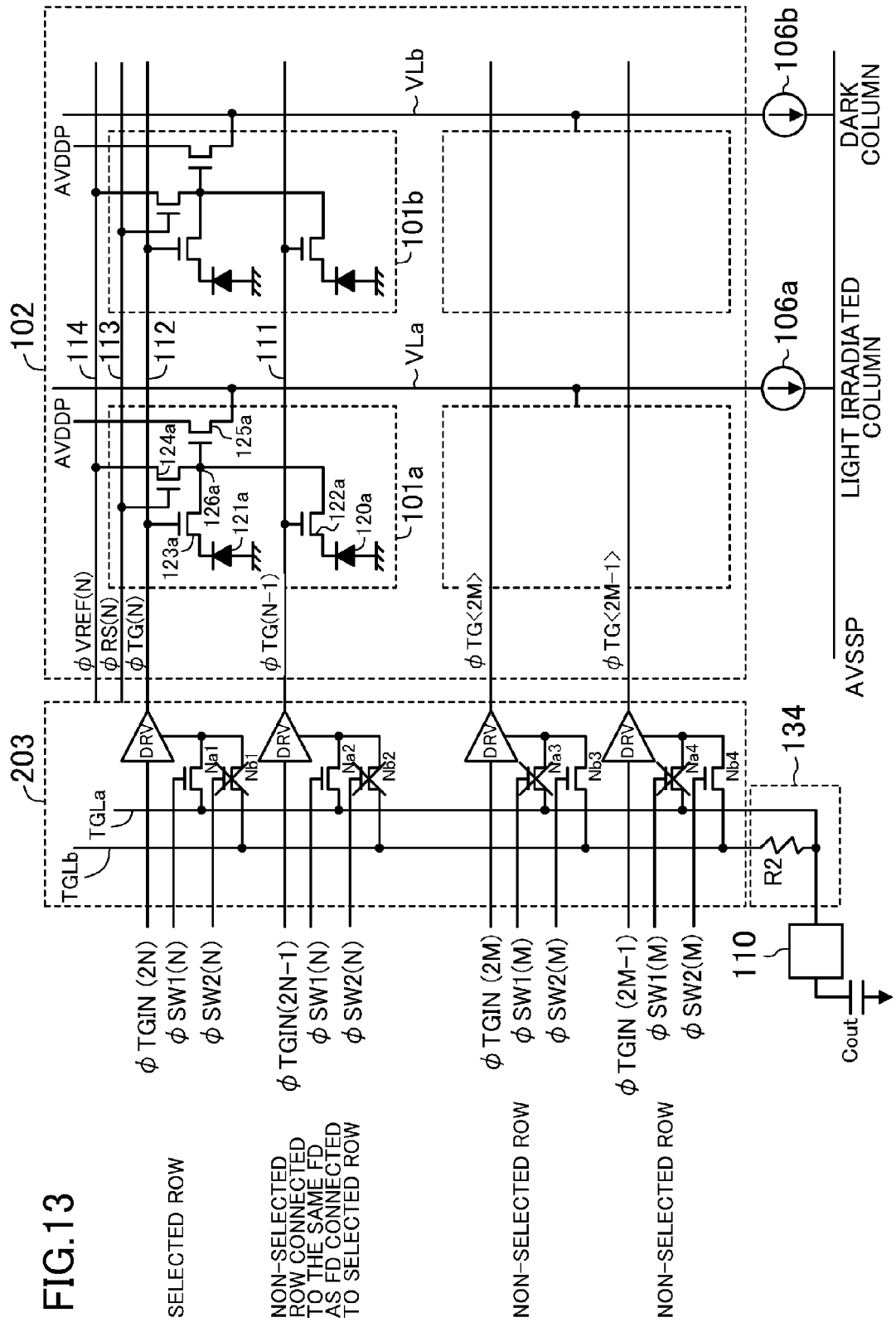
FIG. 13 is a diagram illustrating another example of the pixel array and the driver circuit in the solid-state imaging device of the second embodiment.

FIG. 13 is a diagram illustrating another example of the pixel array 102 and the driver circuit 203 in the solid-state imaging device of the second embodiment of the present disclosure. FIG. 13 illustrates the pixel reading operation.

The same reference numerals as those shown in the circuit illustrated in FIG. 12 are used to represent equivalent elements in FIG. 13, and the description thereof will not be repeated. Differences from the circuit illustrated in FIG. 12 will be mainly described below. In the pixel reading operation, a row to which the transfer pulse ϕTGIN(2N) is input is a selected row for pixel reading operation.

In the pixel cell 101 (i.e., the pixel cell 101a), a transfer pulse ϕTGIN(2N−1) is supplied to a gate electrode of a transfer transistor 122a at a row adjacent to the selected row, and the transfer transistor 122a is connected to an FD(N) 126a connected to a transfer transistor 123a at the selected row. A row to which a transfer pulse ϕTG(N) is input is a selected row, and a row to which a transfer pulse ϕTG(N−1) is input is a non-selected row. Other rows are also non-selected rows.

In the pixel reading operation, at each of the selected and non-selected rows connected to the common PD 126a, an H-level signal is input as the impedance switching control pulse ϕSW1(N) to turn on the transistors Na1, Na2, resulting in a conduction state between the power-supply line TGLa and the buffer circuit DRV. Moreover, an L-level signal is input as the impedance switching control pulse ϕSW2(N) to turn off the transistors Nb1, Nb2, resulting in a non-conduction state between the power-supply line TGLb and the buffer circuit DRV.

Meanwhile, at each of the other non-selected rows, an L-level signal is input as the impedance switching control pulse ϕSW1 to turn off the transistor Na, resulting in a non-conduction state between the power-supply line TGLa and the buffer circuit DRV. Moreover, an H-level signal is input as the impedance switching control pulse ϕSW2 to turn on the transistor Nb, resulting in a conduction state between the power-supply line TGLb and the buffer circuit DRV.

In the foregoing state, when a charge is transferred from a PD 121a to the FD 126a at the pixel cell 101a which is the light irradiated pixel, the potential of the FD 126a decreases because the charge is negative (i.e., electrons) in this case. Accordingly, the potential of a vertical signal line VLa connected to a source electrode of an amplifier transistor 125a also decreases.

Since the number of transfer transistors corresponds to the number of pixels, the number of transfer control lines 111, 112 configured to control the transfer transistors corresponds to the number of pixel rows. The transfer control lines 111, 112 are arranged along the horizontal direction, and the vertical signal lines VL are arranged along the vertical direction. Thus, the lines cross each other at points corresponding to at least the number of pixel rows, and a parasitic capacitance is generated at each cross-point. Due to the parasitic capacitance, a decrease in potential of the vertical signal line VLa is transmitted to the transfer control line 111, 112, and the potential of an L-level signal of the transfer pulse supplied to the transfer control line 111, 112 decreases accordingly.

In the foregoing state, power-supply voltage is, at the selected row, supplied by the power-supply line TGLa in which no resistive element connected to the PAD 110 is provided. Thus, even if the potential of the transfer control line 111, 112 varies, a time constant is small, and variation in potential of the power-supply line TGLa is reduced by the external capacitor Cout.

On the other hand, the resistive element R2 connected to the PAD 110 is provided in the power-supply line TGLb. Thus, the time constant, which is seen from the external capacitor Cout, of the transfer control line 111, 112 at the non-selected row increases in combination with the parasitic capacitances generated in the pixel array 102 to such an extent that variation in potential of the transfer control line 111, 112 at the non-selected row cannot be reduced. However, since the transfer control line 111, 112 is, at the selected row, connected to the power-supply line TGLa in which no resistive element is provided, a common impedance value (i.e., an impedance value for power-supply line) seen from the transfer control lines 111, 112 at the selected and non-selected rows to the PAD 110 is suppressed. Thus, transmission of variation in potential of an L-level signal of the transfer pulse at the non-selected row to the selected row can be suppressed. As a result, occurrence of noise due to variation in potential of the transfer control line 111, 112 can be reduced in the pixel reading operation, and an excessive instantaneous current flow can be reduced in the all reset operation.

Even if the L-level signal of the buffer circuit DRV is a negative voltage, it is also more likely that an excessive instantaneous current flows in the all reset operation. Thus, it is effective to provide the driver circuit 203 of the present embodiment. The common impedance value (i.e., the impedance value for power-supply line) seen from the control line (i.e., a reset control line 113 or a reset power-supply line 114) for pixel cell 101 to the power supply terminal (i.e., the PAD 110) in the reading operation can be less than that in the all reset operation. In such a case, in order to prevent an excessive instantaneous current from concentrating on a single path, a diode element may be arranged in the power-supply line for L-level signal of the buffer circuit DRV, i.e., for negative voltage, such that an anode is on a side close to a ground power supply and a cathode is on a side close to the power-supply line for L-level signal of the buffer circuit DRV. Since the diode is turned on by a potential increase caused due to a resistive component and an instantaneous current in the all reset operation, a path through which an instantaneous current flows into the ground power supply can be formed only when the instantaneous current flows. Thus, paths through each of which an instantaneous current flows can be dispersed, and an excessive instantaneous current flow through a particular line can be reduced.

Note that there is a possibility that, in each of the driver circuit configured to supply the reset pulse φRS and the driver circuit configured to supply the reset power-supply voltage φVDDCELL for pixel, the foregoing variation in potential of the vertical signal line VL is transmitted to the reset control line 113 and the reset power-supply line 114 due to the parasitic capacitances and is transmitted to the ED of the dark pixel of the selected row due to the parasitic capacitance. Thus, it is effective to provide the driver circuit 203 similar to that illustrated in FIG. 13.

Figure 14B:
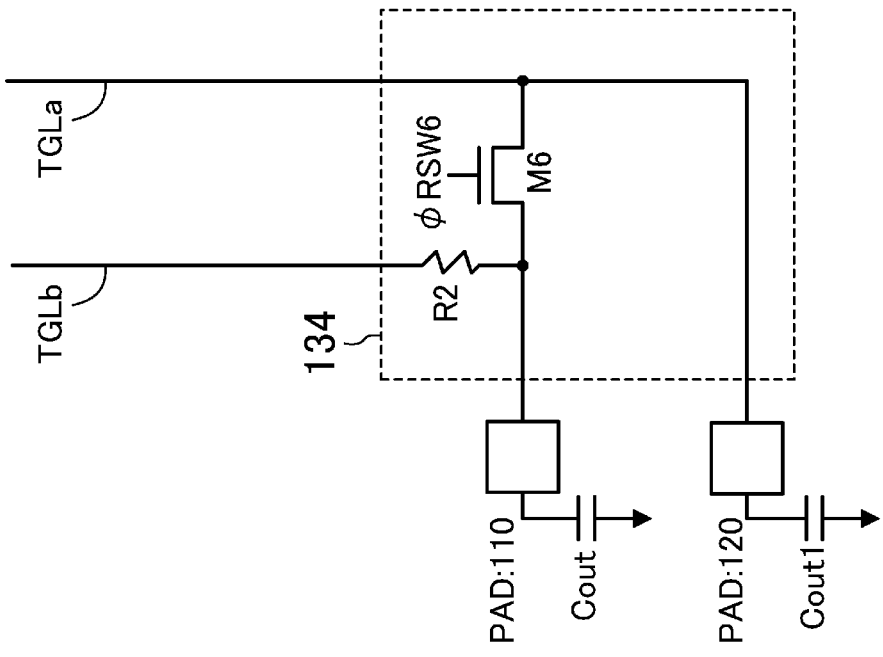
FIGS. 14A and 14B illustrate examples of an impedance switcher circuit in the solid-state imaging device of the second embodiment.
Figure 14A:
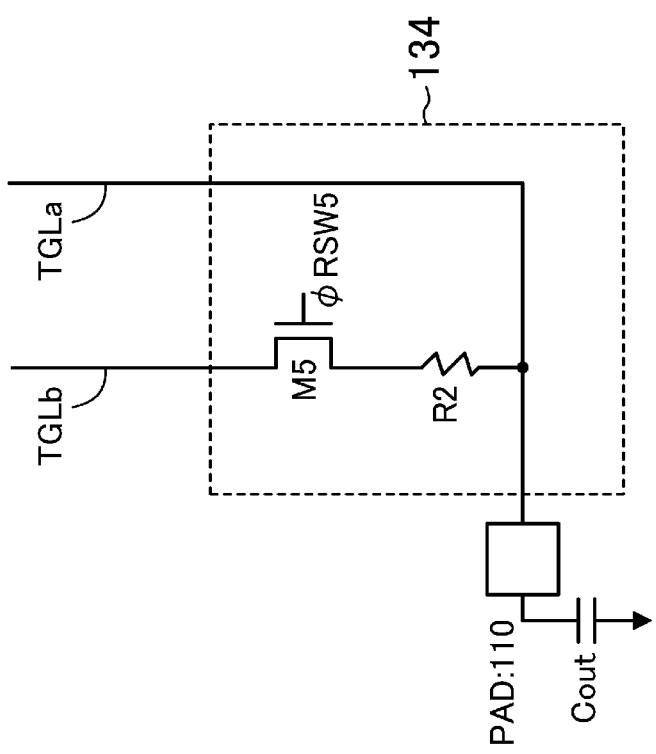

FIGS. 14A and 14B illustrate different examples of the impedance switcher circuit 134 in the solid-state imaging device of the second embodiment of the present disclosure.

In the example illustrated in FIG. 14A, the power-supply line TGLa for L-level signal of the buffer circuit DRV is connected to the PAD 110, and a transistor M5 and the resistive element R2 are connected together in series between the power-supply line TGLb and the PAD 110. Moreover, an impedance switching control pulse φRSW5 for controlling the transistor M5 is connected to a gate electrode of the transistor M5.

In the foregoing state, the transistor M5 is turned on in the all reset operation, and power-supply voltage is supplied from the external capacitor Cout to the power-supply line TGLb.

Next, the transistor M5 is turned off in the pixel reading operation, paths of the power-supply lines TGLa, TGLb are completely separated from each other. Thus, noise caused at the power-supply line TGLb can be prevented from entering the power-supply line TGLa, and therefore property degradation of the solid-state imaging device can be reduced.

In a rolling shutter method, pixel signal reset operation for performing "reset of the PD/change of an FD potential to a non-selected potential" and the pixel reading operation subsequent to exposure are performed. In the pixel reading operation, the transistor M5 is turned off, and the paths of the power-supply lines TGLa, TGLb are completely separated from each other. In the pixel signal reset operation, the transistor M5 is turned on, and power-supply voltage is supplied from the external capacitor Cout to non-selected pixels.

In the example illustrated in FIG. 14B, the power-supply line TGLa for L-level signal of the buffer circuit DRV is connected to a PAD 120, and the resistive element R2 is connected in series between the power-supply line TGLb and the PAD 110. Moreover, a transistor M6 configured to connect between the PAD 110 and the PAD 120 is provided, and an impedance switching control pulse φRSW6 for controlling the transistor M6 is connected to a gate electrode of the transistor M6.

In the foregoing state, in the all reset operation, the transistor M6 is turned on, and power-supply voltage is supplied from the external capacitor Cout and an external capacitor Cout1 to the power-supply line TGLb.

Next, in the pixel reading operation, the transistor M6 is turned off, and the paths of the power-supply lines TGLa, TGLb are completely separated from each other. Thus, noise caused at the power-supply line TGLb can be prevented from entering the power-supply line TGLa, and therefore property degradation of the solid-state imaging device can be reduced.

In the pixel reading operation of the rolling shutter method, the transistor M6 is turned off, and the paths of the power-supply lines TGLa, TGLb are completely separated from each other. In the pixel signal reset operation, the transistor M6 is turned on, and power-supply voltage is supplied from the external capacitors Cout, Cout1 to non-selected pixels.

(Third Embodiment)

An imaging apparatus of a third embodiment of the present disclosure will be described below with reference to drawings. Note that the present embodiment is configured such that the solid-state imaging device of the first or second embodiment (including the variations thereof) is employed for a photographic apparatus embedded in a camera such as a video camera which is capable of obtaining a moving picture or a digital still camera which is capable of obtaining a still image.

Figure 15:
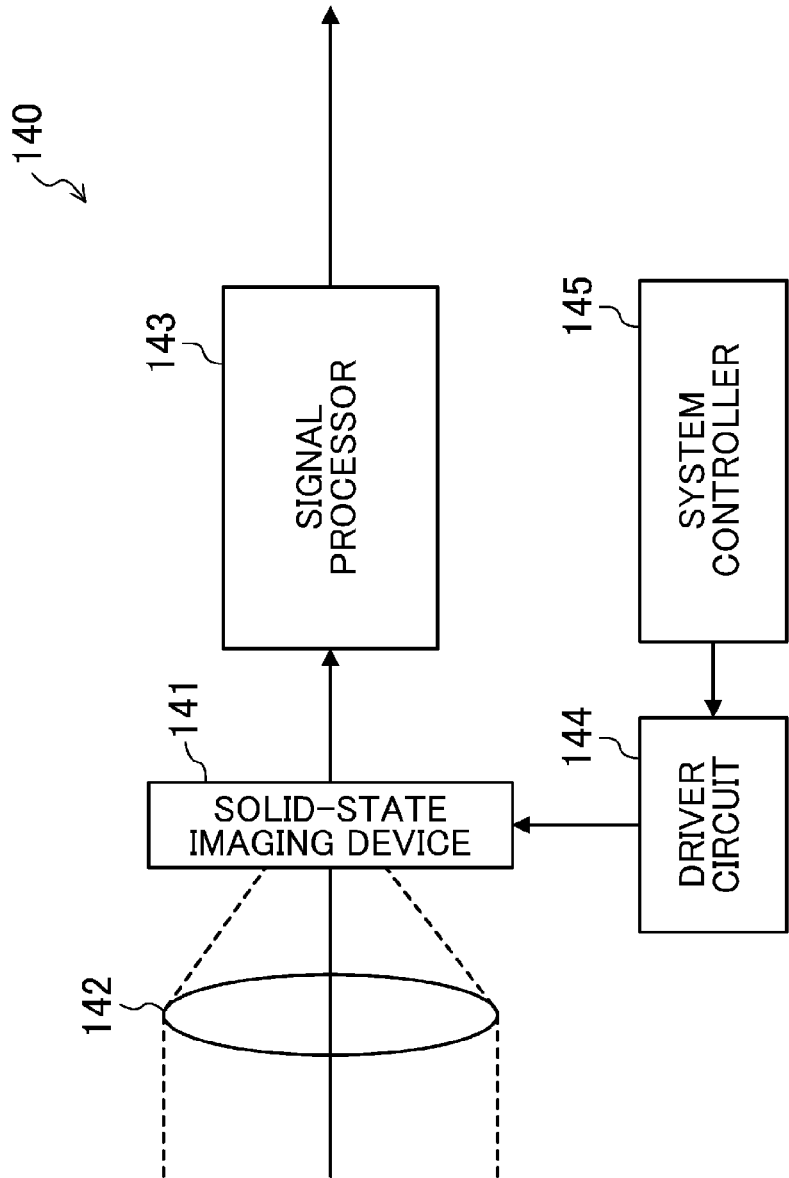
FIG. 15 is a block diagram illustrating a configuration of an imaging apparatus of a third embodiment.
Figure 16:
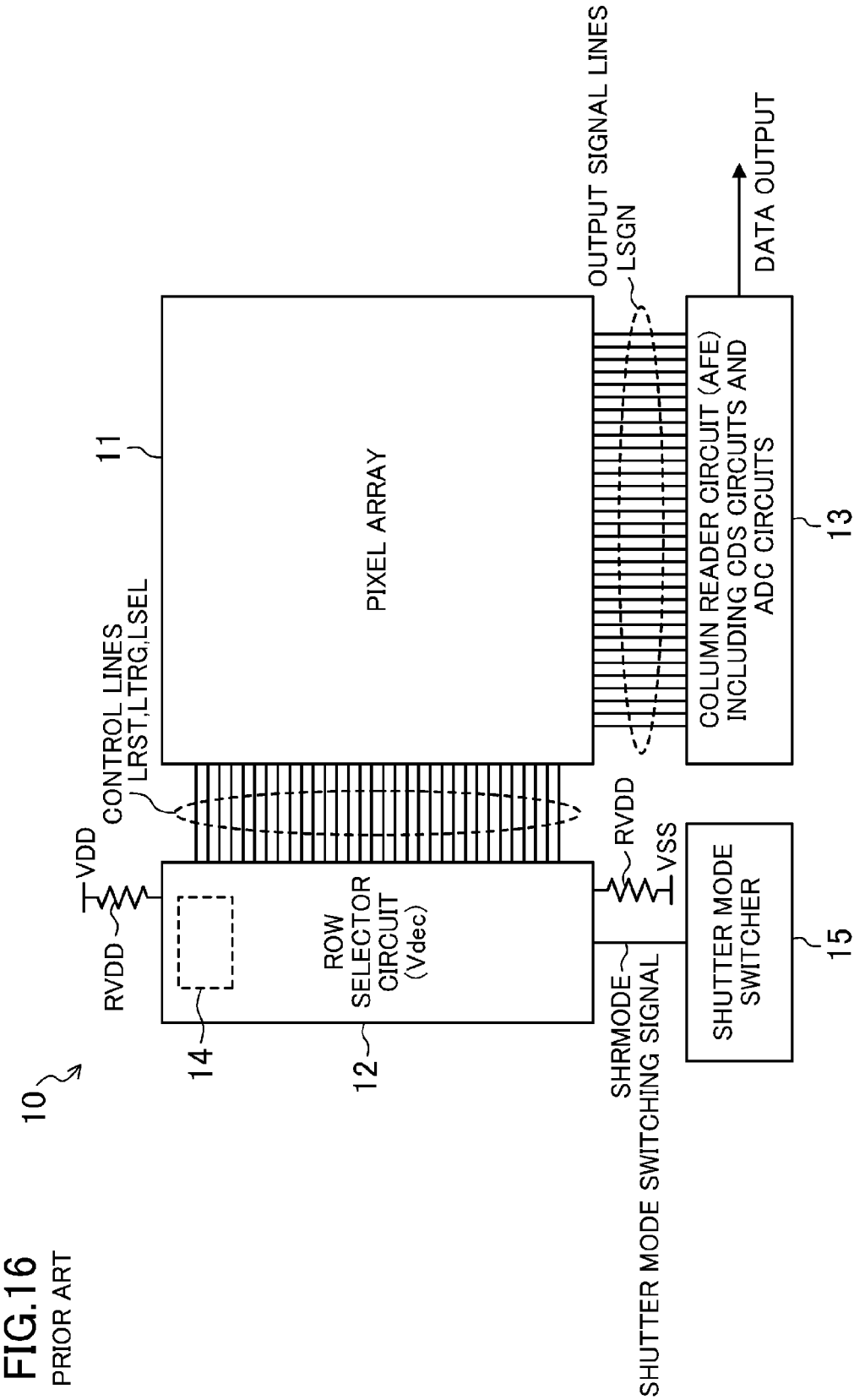
FIG. 16 is a diagram illustrating a configuration of a conventional solid-state imaging device.

FIG. 15 is a block diagram illustrating a configuration of the imaging apparatus of the present embodiment. Referring to FIG. 15, an imaging apparatus 140 of the present embodiment includes a solid-state imaging device 141, an imaging optical system 142 configured to guide incident light output from an object to the solid-state imaging device 141, a signal processor 143 configured to process an output signal from the solid-state imaging device 141, a driver circuit 144 configured to drive the solid-state imaging device 141, and a system controller 145 configured to control the driver circuit 144.

In the imaging apparatus 140 illustrated in FIG. 15, the solid-state imaging device of the first or second embodiment (including the variations thereof) is used as the solid-state imaging device 141.

The driver circuit 144 receives a control signal corresponding to a drive mode from the system controller 145, and supplies a drive mode signal to the solid-state imaging device 141. In the solid-state imaging device 141 to which the drive mode signal is supplied, a timing generator circuit (i.e., the TG circuit 109 illustrated in FIG. 1) generates a drive pulse corresponding to the drive mode signal, and supplies the drive pulse to each block of the solid-state imaging device 141.

The signal processor 143 receives an image signal output from the solid-state imaging device 141, and performs various types of signal processing for the image signal.

As described above, in the imaging apparatus of the present embodiment used for, e.g., the video camera or the digital still camera, the solid-state imaging device of the first or second embodiment (including the variations thereof) is used. Thus, in the solid-state imaging device, noise due to variation in potential of the control line can be reduced in such a manner that an instantaneous current is reduced in all reset operation and that variation in potential of the control line configured to drive the pixels are reduced. Thus, according to the imaging apparatus of the present embodiment, the quality of an obtained image can be improved.

Variations of the circuit configurations and the drive methods of the solid-state imaging device and the imaging apparatus are possible without departing from the scope of the invention.

The solid-state imaging device and the drive method thereof according to one example of the present disclosure are suitably used for various imaging apparatuses such as video cameras and digital still cameras.

What is claimed is:

1. A solid-state imaging device comprising:
   a pixel array formed of a plurality of pixels arranged in rows and columns, each pixel including
      a photoelectric conversion element configured to convert incident light into a signal charge,
      a floating diffusion,
      a transfer transistor configured to transfer the signal charge generated by the photoelectric conversion element to the floating diffusion,
      an amplifier transistor configured to convert the signal charge transferred to the floating diffusion into an image signal which is a voltage signal and output the image signal, and
      a reset transistor configured to supply a reset potential to the floating diffusion; and
   a driver circuit configured to control operation of the transfer transistor and the reset transistor through a plurality of control lines each provided for a corresponding one of the rows of the pixels of the pixel array and connected to a power-supply line,
   wherein the driver circuit performs all reset operation in which the signal charges are reset at all pixels and reading operation in which the image signal is read from each row of the pixels of the pixel array,
   an impedance controller configured to control an impedance value for the power-supply line in the reading operation to be less than an impedance value for the power-supply line in the all reset operation is provided,
   any one of the rows of the pixels of the pixel array is sequentially selected in the reading operation, and
   when a first line part extends from one of the control lines connected to the pixels at a selected one of the rows in the reading operation to the power-supply line, and a second line part extends from another one of the control lines connected to the pixels at a non-selected one of the rows in the reading operation to the power-supply line, an impedance value at a common part between the first line part and the second line part is less in the reading operation than in the all reset operation.

2. The solid-state imaging device of claim 1, wherein an impedance switcher circuit connected to the power-supply line and having two or more switchable current paths is provided as the impedance controller.

3. The solid-state imaging device of claim 2, wherein the impedance switcher circuit includes a first transistor and a first impedance element connected together in parallel to each other in the power-supply line, and the first transistor is turned off in the all reset operation, and is turned on in the reading operation.

4. The solid-state imaging device of claim 2, wherein the impedance switcher circuit includes a second transistor and a third transistor connected together in parallel to each other in the power-supply line.

5. The solid-state imaging device of claim 1, wherein the plurality of control lines include a first control line connected to a gate electrode of the transfer transistor, the power-supply line is a line configured to supply a potential for bringing the transfer transistor into a non-conduction state to the first control line, and the impedance controller controls the impedance value for the power-supply line in the reading operation to be less than the impedance value for the power-supply line in the all reset operation.

6. The solid-state imaging device of claim 1, wherein the power-supply line supplies a negative potential.

7. The solid-state imaging device of claim 1, wherein the power-supply line includes first and second power-supply lines,
   the driver circuit is provided for each row of the pixels, and includes a plurality of buffer circuits connected to the first and second power-supply lines,
   a second impedance element is provided in the second power-supply line,
   a first switch is provided between the first power-supply line and each buffer circuit,
   a second switch is provided between the second power-supply line and each buffer circuit, and
   the impedance controller includes the first and second power-supply lines, the first and second switches, and the second impedance element.

8. The solid-state imaging device of claim 7, further comprising:
   a third switch provided between the first and second power-supply lines and configured to control connection.

9. The solid-state imaging device of claim 7, wherein the plurality of control lines include a first control line connected to a gate electrode of the transfer transistor, the first or second power-supply line is a line configured to supply a potential for bringing the transfer transistor into a non-conduction state to the first control line, and the impedance controller controls the impedance value for the power-supply line in the reading operation to be less than the impedance value for the power-supply line in the all reset operation.

10. The solid-state imaging device of claim 9, wherein in the all reset operation, the first switch is turned off, and the second switch is turned on, and
   in the reading operation,
      at one of the rows which is selected for reading the pixel signal, the first switch is turned on, and the second switch is turned off, and
      at another one of the rows which is not selected for reading the pixel signal, the first switch is turned off, and the second switch is turned on.

11. The solid-state imaging device of claim 1, wherein a plurality of transfer transistors are provided at each pixel, and
   the transfer transistors are connected to the floating diffusion.

12. An imaging apparatus comprising:
   a solid-state imaging device configured to output a pixel signal corresponding to incident light;
   an imaging optical system configured to guide the incident light to the solid-state imaging device; and
   a signal processor configured to process the pixel signal output from the solid-state imaging device,
   wherein the solid-state imaging device includes
      a pixel array formed of a plurality of pixels arranged in rows and columns, each pixel including
         a photoelectric conversion element configured to convert the incident light into a signal charge,
         a floating diffusion,
         a transfer transistor configured to transfer the signal charge generated by the photoelectric conversion element to the floating diffusion, an amplifier transistor configured to convert the signal charge transferred to the floating diffusion into an image signal which is a voltage signal and output the image signal, and a reset transistor configured to supply a reset potential to the floating diffusion, and a driver circuit configured to control operation of the transfer transistor and the reset transistor through a plurality of control lines each provided for a corresponding one of the rows of the pixels of the pixel array and connected to a power-supply line, the driver circuit performs all reset operation in which the signal charges are reset at all pixels and reading operation in which the image signal is read from each row of the pixels of the pixel array, an impedance controller configured to control an impedance value for the power-supply line in the reading operation to be less than an impedance value for the power-supply line in the all reset operation is provided, any one of the rows of the pixels of the pixel array is sequentially selected in the reading operation, and when a first line part extends from one of the control lines connected to the pixels at a selected one of the rows in the reading operation to the power-supply line, and a second line part extends from another one of the control lines connected to the pixels at a non-selected one of the rows in the reading operation to the power-supply line, an impedance value at a common part between the first line part and the second line part is less in the reading operation than in the all reset operation.

13. The imaging apparatus of claim 12, further comprising:
a capacitor arranged outside the solid-state imaging device,
wherein the solid-state imaging device further includes a pad connected to each of the power-supply line and the capacitor.

14. A solid-state imaging device comprising:
a pixel array formed of a plurality of pixels arranged in rows and columns, each pixel including
  a photoelectric conversion element configured to convert incident light into a signal charge,
  a floating diffusion,
  a transfer transistor configured to transfer the signal charge generated by the photoelectric conversion element to the floating diffusion,
  an amplifier transistor configured to convert the signal charge transferred to the floating diffusion into an image signal which is a voltage signal and output the image signal, and
  a reset transistor configured to supply a reset potential to the floating diffusion; and
a driver circuit configured to control operation of the transfer transistor and the reset transistor through a plurality of control lines each provided for a corresponding one of the rows of the pixels of the pixel array and connected to a power-supply line,
wherein the driver circuit performs reading operation in which the image signal is read from each row of the pixels of the pixel array, and
when a first power-supply line extends from one of the control lines connected to the pixels at a selected one of the rows in the reading operation to the power-supply line, and a second power-supply line extends from another one of the control lines connected to the pixels at a non-selected one of the rows in the reading operation to the power-supply line, the number of pixels connected to the first power-supply line are less than the number of pixels connected to the second power-supply line.

15. The solid-state imaging device of claim 14, wherein
the driver circuit performs reset operation in which the signal charges are reset at the pixels and the reading operation in which the image signal is read from each row of the pixels of the pixel array, and
an impedance controller configured to control an impedance value at a common part between the first and second power-supply lines in the reading operation to be less than an impedance value at the common part in the reset operation is provided.

16. The solid-state imaging device of claim 14, wherein
a fourth switch configured to control connection is provided between the first and second power-supply lines.

17. The solid-state imaging device of claim 14, wherein
the control lines include a first control line connected to a gate electrode of the transfer transistor, and
the first or second power-supply line is a line configured to supply a potential for bringing the transfer transistor into a non-conduction state to the first control line.

* * * * *